(12) United States Patent
Kuma et al.

(10) Patent No.: US 11,915,390 B2
(45) Date of Patent: Feb. 27, 2024

(54) IMAGE PROCESSING DEVICE AND METHOD

(71) Applicant: SONY GROUP CORPORATION, Tokyo (JP)

(72) Inventors: Satoru Kuma, Tokyo (JP); Ohji Nakagami, Tokyo (JP); Koji Yano, Tokyo (JP); Tsuyoshi Kato, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 349 days.

(21) Appl. No.: 17/296,002

(22) PCT Filed: Dec. 24, 2019

(86) PCT No.: PCT/JP2019/050453
§ 371 (c)(1),
(2) Date: May 21, 2021

(87) PCT Pub. No.: WO2020/145117
PCT Pub. Date: Jul. 16, 2020

(65) Prior Publication Data
US 2022/0012849 A1   Jan. 13, 2022

(30) Foreign Application Priority Data

Jan. 7, 2019   (JP) ................. 2019-000627

(51) Int. Cl.
*G06T 9/00* (2006.01)
*G06T 5/00* (2006.01)
*G06T 3/40* (2006.01)

(52) U.S. Cl.
CPC ............ *G06T 5/001* (2013.01); *G06T 3/40* (2013.01); *G06T 9/001* (2013.01)

(58) Field of Classification Search
CPC ........ G06T 9/00–40; G06T 5/001; G06T 3/40
See application file for complete search history.

(56) References Cited

U.S. PATENT DOCUMENTS

| | | | |
|---|---|---|---|
| 2018/0268570 A1* | 9/2018 | Budagavi | G06T 9/001 |
| 2019/0087979 A1* | 3/2019 | Mammou | H04N 19/597 |

(Continued)

FOREIGN PATENT DOCUMENTS

| | | |
|---|---|---|
| EP | 3376761 A1 | 9/2018 |
| WO | WO 2018/130491 A1 | 7/2018 |
| WO | WO 2019/055772 A1 | 3/2019 |

OTHER PUBLICATIONS

R. Mekuria et al., Design, Implementation and Evaluation of a Point Cloud Codec for Tele-Immersive Video, IEEE Transactions on Circuits and Systems for Video Technology, Jan. 2016, pp. 1-14, IEEE.

(Continued)

*Primary Examiner* — Sean T Motsinger
(74) *Attorney, Agent, or Firm* — Paratus Law Group, PLLC

(57) ABSTRACT

There is provided an image processing device and a method capable of suppressing lowering of image quality. Correction information that is information regarding correction of 3D data representing a three-dimensional structure constructed using 2D data representing a two-dimensional image is generated, and the generated correction information is coded. Furthermore, coded data of correction information that is information regarding correction of 3D data representing a three-dimensional structure constructed using 2D data representing a two-dimensional image is decoded, and 3D data is constructed using the 2D data and correction information generated by decoding coded data of the correction information. The present disclosure can be applied to, for example, an information processing device, an image (Continued)

processing device, an electronic apparatus, an information processing method, a program, or the like.

10 Claims, 14 Drawing Sheets

(56) References Cited

U.S. PATENT DOCUMENTS

| | | | | |
|---|---|---|---|---|
| 2019/0311502 | A1* | 10/2019 | Mammou | G06T 17/00 |
| 2019/0373241 | A1* | 12/2019 | Boyce | G06F 3/011 |
| 2020/0007867 | A1* | 1/2020 | Tourapis | H04N 19/156 |
| 2020/0020132 | A1* | 1/2020 | Sinharoy | H03M 7/3059 |
| 2020/0043190 | A1* | 2/2020 | Tanner | G06T 5/002 |
| 2020/0045285 | A1* | 2/2020 | Varerkar | H04N 19/597 |
| 2020/0045288 | A1* | 2/2020 | Boyce | H04N 13/167 |
| 2020/0045290 | A1* | 2/2020 | Ruhm | H04N 13/275 |
| 2020/0120347 | A1* | 4/2020 | Boyce | H04N 19/196 |
| 2020/0195967 | A1* | 6/2020 | Graziosi | H04N 19/80 |
| 2021/0201540 | A1* | 7/2021 | Zhang | H04N 19/597 |
| 2021/0217139 | A1* | 7/2021 | Yano | G06T 5/10 |
| 2021/0233278 | A1* | 7/2021 | Kuma | G06T 19/20 |
| 2022/0012849 | A1* | 1/2022 | Kuma | H04N 19/85 |
| 2022/0164993 | A1* | 5/2022 | Llach | G06T 9/001 |

OTHER PUBLICATIONS

Tim Golla et al., Real-time Point Cloud Compression, 2015 IEEE/RSJ International Conference on Intelligent Robots and Systems (IROS), Sep. 28-Oct. 2, 2015, pp. 1-6.

Khaled Mammou et al., Video-based and Hierarchical Approaches Point Cloud Compression, International Organization for Standardization, Coding of Moving Pictures and Associated Audio, ISO/IEC JTC1/SC29/WG11, m41649, Oct. 2017, pp. 1-3, Macau, China.

PCC Test Model Category 2 v0, International Organisation for Standardisation, Coding of Moving Pictures and Audio, ISO/IEC JTC1/SC29/WG11, N17248, Oct. 2017, pp. 1-11, Macau, China.

Dejun Zhang et al., [VPCC] New proposal of an adaptive outlier removing method, International Organisation for Standardisation, Coding of Moving Pictures and Audio, ISO/IEC JTC1/SC29/WG11, MPEG2018/m44766, Oct. 2018, pp. 1-4, Macau, China.

Dejun Zhang et al., [VPCC] New proposal of an adaptive hole filling method for reconstructed point cloud, International Organisation for Standardisation, Coding of Moving Pictures and Audio, ISO/IEC JTC1/SC29/WG11, MPEG2018/m44767, Oct. 2018, pp. 1-5, Macau, China.

Vida Fakour Sevom et al., Geometry-Guided 3D Data Interpolation for Projection-Based Dynamic Point Cloud Coding, 2018 7th European Workshop on Visual Information Processing (EUVIP), Nov. 26-28, 2018, pp. 1-6, IEEE.

Keming Cao et al., Patch-Aware Averaging Filter for Scaling in Point Cloud Compression, 2018 IEEE Global Conference on Signal and Information Processing (GlobalSIP), Nov. 26-29, 2018, pp. 390-394, IEEE.

"PCC WO Category 2", 122. MPEG Meeting; Apr. 16, 2018-Apr. 20, 2020; San Diego; (Motion Picture Expert Group or 1S0/IEC JTC1/SC29/WG11), No. n17534 Jul. 13, 2018, XP030263811, Retrieved from the Internet: URL: http://phenix.int-evry.fr/mpeg/doc_end_user/documents/ 122_San%20Diego/wg11/w17534.zip w17534_clean.docx [retrieved on Jul. 13, 2018].

Anonymous: "Algorithm description of mpeg-pcc-tmc2 (v-pcc)", 123. MPEG Meeting; Jul. 16, 2018-Jul. 20, 2018; Ljubljana; (Motion Picture Expert Group or 1S0/IEC JTC1/SC29/WG11), No. N17767; n17767 Oct. 2, 2018, pp. 1-22, XP030191777, Retrieved from the Internet: URL:http://phenix.int-evry.fr/mpeg/doc_end_user/documents/123_Ljubljana/ wg11/w17767.zip w17767_VPCC_AlgorithmDescription.docx [retrieved on Oct. 2, 2018].

Julien Ricard (Technicolor) et al: "Block to patch index coding", 122. MPEG Meeting; Apr. 16, 2018-Apr. 20, 2020; San Diego; (Motion Picture Expert Group or 1S0/IEC JTC1/SC29/WG11), No. m42629 Apr. 11, 2018, XP030070968, Retrieved from the Internet: URL:http://phenix.int-evry.fr/mpeg/doc_end_user/documents/122_San%20Diego/wg11 /m42629-v1-m42629-Blocktopatchindexcoding.zip m42629 - Block to patch index coding.docx [retrieved on Apr. 11, 2018].

* cited by examiner

FIG. 2

| METHOD | CONTENT |
|---|---|
| METHOD 1 | CORRECT CONVERSION OF 2D DATA INTO 3D DATA |
| METHOD 1-1 | TRANSMIT CORRECTION METHOD |
| METHOD 1-2 | TRANSMIT CORRECTION AMOUNT |
| METHOD 1-3 | CORRECT CONVERSION THAT USES Omap WITH N×N ACCURACY |
| METHOD 1-4 | CORRECT CONVERSION THAT USES Omap WITH 1×1 ACCURACY |

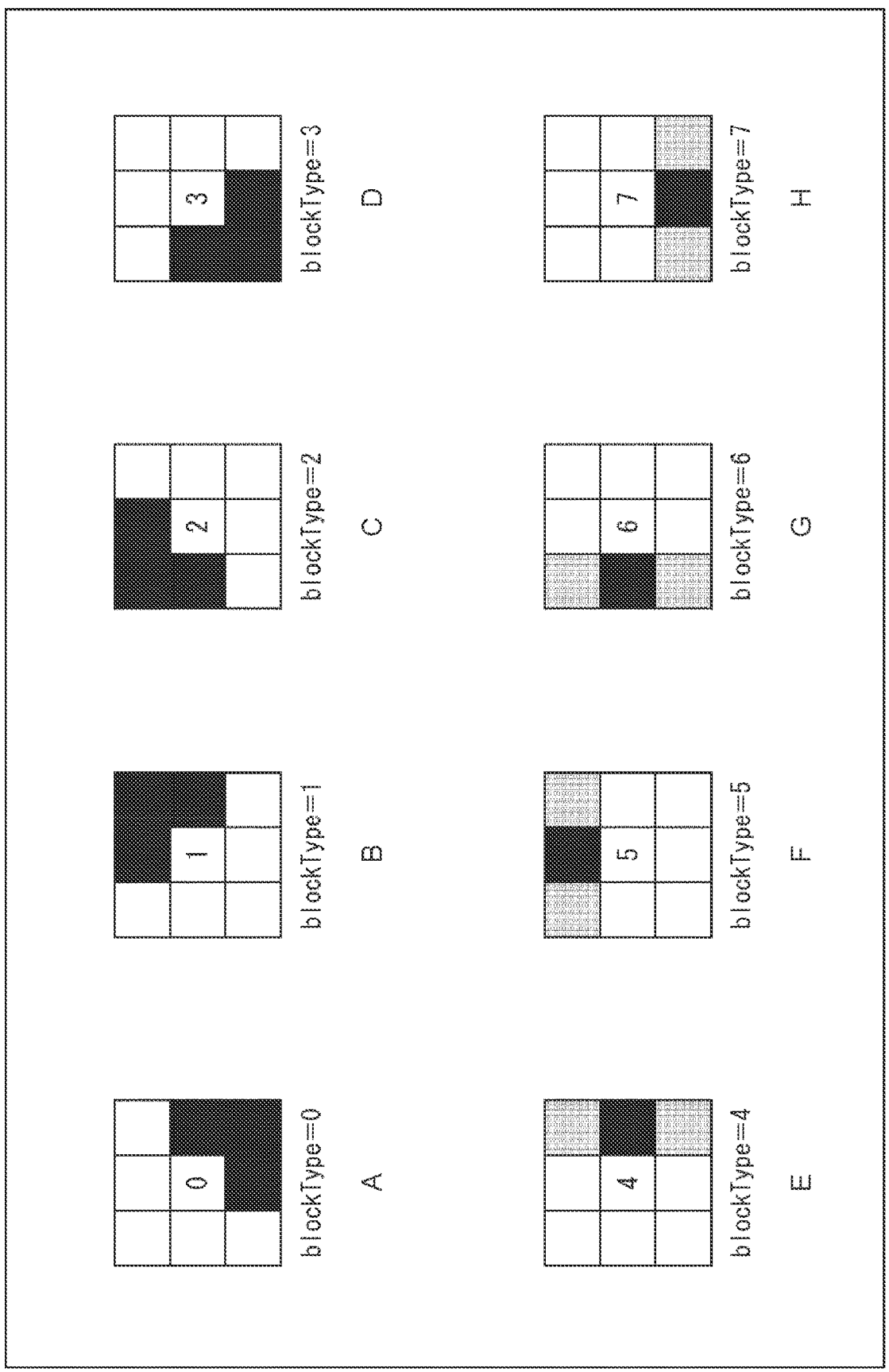

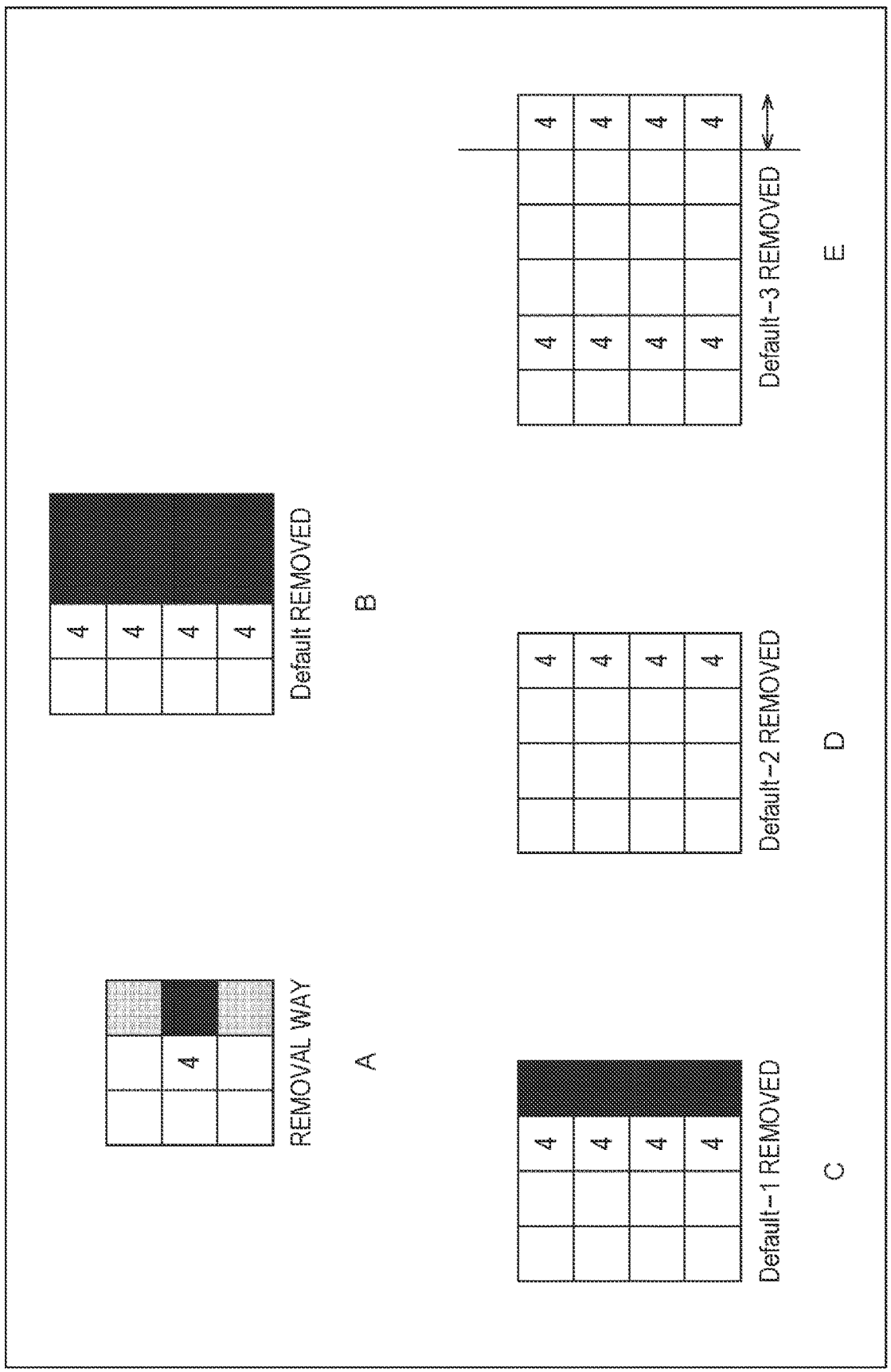

FIG. 5

| | Descriptor |
|---|---|
| frame_auxiliary_information( ) { | |
| patch_count | u(32) |
| occupancy_precision | u(8) |
| max_candidate_count | u(8) |
| bit_count_u0 | u(8) |
| bit_count_v0 | u(8) |
| bit_count_u1 | u(8) |
| bit_count_v1 | u(8) |
| bit_count_d1 | u(8) |
| ... | |
| if(omapFilterTypeIsNotDefault) | u(1) |
| omapFilterTypeFrameLevel | u(4) |
| if(omapFilterTypeFrameLevel) | u(1) |
| omapFilterValueFrameLevel | u(4) |
| occupancy_aux_stream_size | u(32) |
| for (i=0;i<patch_count;i++) { | |
| patchList[i].patch_u0 | ae(v) |
| patchList[i].patch_v0 | ae(v) |
| ... | |
| patchList[i].delta_size_v0 | se(v) |
| patchList[i].normal_axis | ae(v) |
| if(omapFilterTypeIsNotDefault) | u(1) |
| omapFilterTypeFrameLevel | u(4) |
| if(omapFilterTypePatchLevel) | u(1) |
| patchList[i].omapFilterValue | u(4) |
| } | |

A

| omapFilterValueFrameLevel /omapFilterValue | DIFFERENCE FROM Default |
|---|---|
| 0 | +1 |
| 1 | -1 |
| 2 | +2 |
| 3 | -2 |
| 4 | +3 |
| 5 | -3 |
| 6 | +4 |
| 7 | -4 |

B

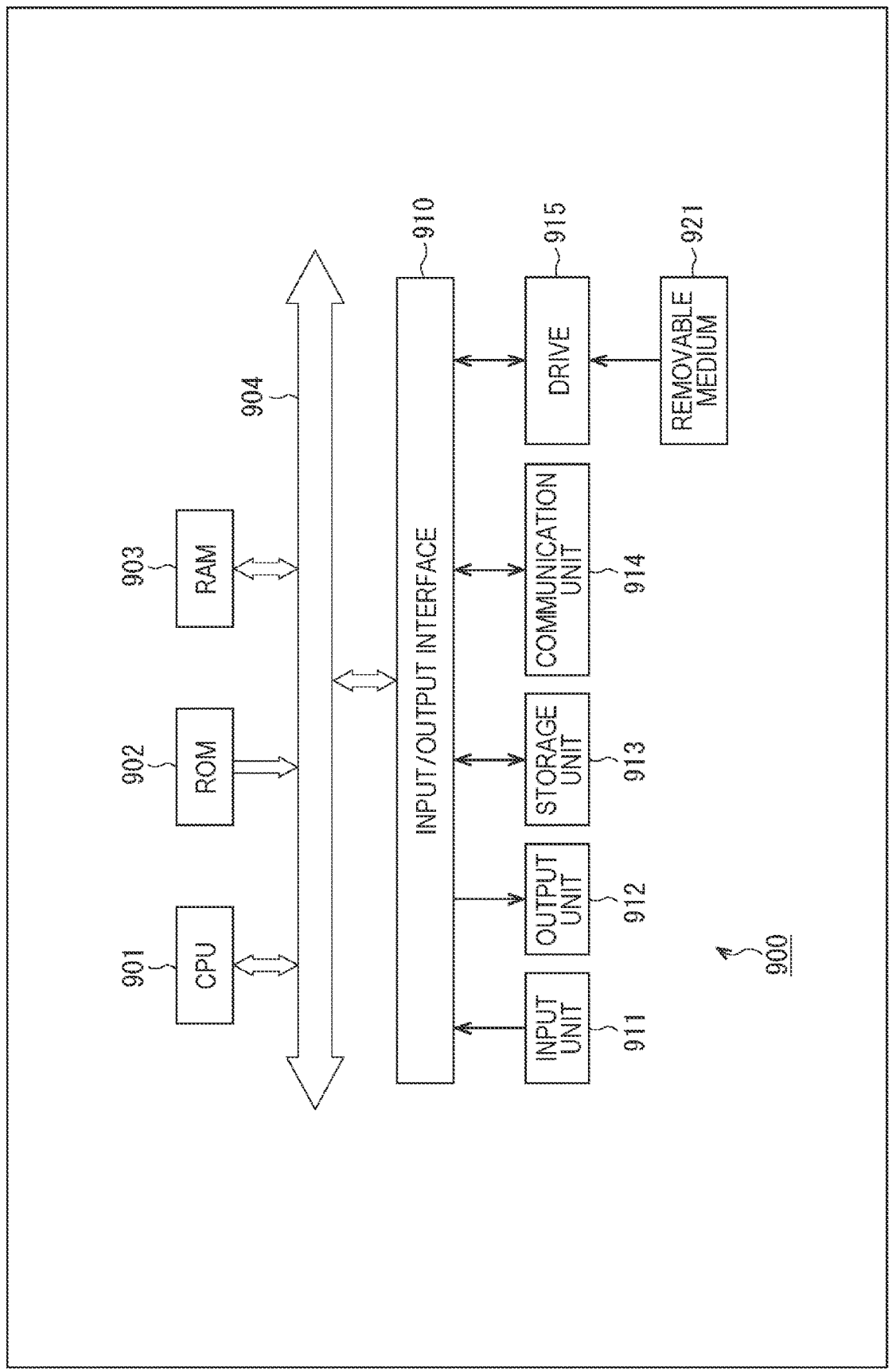

IMAGE PROCESSING DEVICE AND METHOD

CROSS REFERENCE TO PRIOR APPLICATION

This application is a National Stage Patent Application of PCT International Patent Application No. PCT/JP2019/050453 (filed on Dec. 24, 2019) under 35 U.S.C. § 371, which claims priority to Japanese Patent Application No. 2019-000627 (filed on Jan. 7, 2019), which are all hereby incorporated by reference in their entirety.

TECHNICAL FIELD

The present disclosure relates to an image processing device and a method, and more particularly to an image processing device and a method capable of suppressing lowering of image quality.

BACKGROUND ART

Conventionally, as a method of coding 3D data representing a three-dimensional structure such as a point cloud, for example, there has been coding that uses a voxel such as the Octree (for example, see Non-Patent Document 1), for example.

In recent years, a method of projecting position information of a point cloud and attribute information on a two-dimensional plane for each small area, arranging an image (patch) projected on the two-dimensional plane in a frame image, and coding the frame image with a coding method for a two-dimensional image (which will be hereinafter also referred to as a video-based approach) has been proposed (for example, see Non-Patent Document 2 to Non-Patent Document 4) as another coding method, for example.

In a case where an occupancy map indicating presence or absence of a patch at each position of the frame image is used in this video-based approach, the coding efficiency can be improved by lowering the resolution and reducing the amount of information.

However, if the resolution of the occupancy map is lowered, there has been a possibility that the patch range indicated by the occupancy map and the actual patch range may not coincide, and a point that is not originally present may be generated during reconstruction of 3D data. Thus, a method of correcting the position of such a point by smoothing has been considered. However, even if such smoothing is performed, there has been a possibility that the peak signal-to-noise ratio (PSNR) may deteriorate. Thus, a method of removing a blank part generated by lowering the resolution (N×N accuracy) of the occupancy map has been considered (for example, see Non-Patent Document 5).

Furthermore, in the case of a high-resolution occupancy map (1×1 accuracy) having no overlapping of patches, there has been a possibility that a gap may be formed between adjacent patches if the position of the patch boundary point is distorted, and may become a hole (missing part) in a two-dimensional image for display generated from 3D data. Thus, a method of widening the boundary of a high-resolution occupancy map (1×1 accuracy) has also been considered. (for example, see Non-Patent Document 6).

CITATION LIST

Non-Patent Document

Non-Patent Document 1: R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf Non-Patent Document 2: Tim Golla and Reinhard. Klein, "Real-time Point Cloud Compression," IEEE, 2015

Non-Patent Document 3: K. Mammou, "Video-based and Hierarchical Approaches Point. Cloud Compression", MPEG m41649, October 2017

Non-Patent Document 4: K. Mammou, "PCC Test Model Category 2 v0," N17248 MPEG output document, October 2017

Non-Patent Document 5: Dejun Zhang, Zheng Liu, Vladyslav Zakharchenko, Jianle Chen, Kangying Cai, "[VPCC] New proposal of an adaptive outlier removing method", ISO/IEC JTC1/SC29/WG11 MPEG2018/m44766, October 2018, Macau, China Non-Patent Document 6: Dejun Man., Meng Liu, Vladyslav Zakharchenko, Jianle Chen, Kangying Cai, "[VPCC] New proposal of an adaptive hole filling method for reconstructed point cloud", ISO/IEC JTC1/SC29/WG11 MPEG2018/m44767, October 2018, Macau, China

SUMMARY OF THE INVENTION

Problems to be Solved by the Invention

However, since the occupancy map is corrected in the methods described in Non-Patent Document 5 and Non-Patent Document 6, there has been a possibility that another patch may be included in an area indicating the existence of one patch, and the constructed 3D data may deteriorate. Therefore, there has been a possibility that the subjective image quality of the display image obtained by projecting the 3D data on a two-dimensional plane may lower.

The present disclosure has been made in view of such a situation, and makes it possible to suppress lowering of the image quality of a two-dimensional image for displaying 3D data.

Solutions to Problems

An image processing device according to an aspect of the present technology is an image processing device including: a correction information generation unit that generates correction information that is information regarding correction of 3D data representing a three dimensional structure constructed using 2D data representing a two-dimensional image; and a correction information coding unit that codes the correction information generated by the correction information generation unit.

An image processing method according to an aspect of the present technology is an image processing method including: generating correction information that is information regarding correction of 3D data representing a three-dimensional structure constructed using 2D data representing a two-dimensional image; and coding the generated correction information.

An image processing device according to another aspect of the present technology is an image processing device including: a correction information decoding unit that decodes coded data of correction information that is information regarding correction of 3D data representing a three-dimensional structure constructed using 2D data representing a two-dimensional image; and a construction unit that constructs the 3D data by using the 2D data and the correct on information generated by decoding coded data of the correction information by the correction information decoding unit.

An image processing method according to another aspect of the present technology is an image processing method including: decoding coded data of correction information that is information regarding correction of 3D data representing a three-dimensional structure constructed using 2D data representing a two-dimensional image; and constructing the 3D data by using the 2D data and the correction information generated by decoding coded data of the correction information.

In an image processing device and a method according to an aspect of the present technology, correction information that is information regarding correction of 3D data representing a three-dimensional structure constructed using 2D data representing a two-dimensional image is generated, and the generated correction information is coded.

In an image processing device and a method according to another aspect of the present technology, coded data of correction information that is information regarding correction of 3D data representing a three-dimensional structure constructed using 2D data representing a two-dimensional image is decoded, and the 3D data is constructed using the 2D data and correction information generated by decoding coded data of correction information.

BRIEF DESCRIPTION OF DRAWINGS

FIG. 2 is a diagram for explaining an example of a correction method.

FIG. 3 is a diagram illustrating candidate examples of a removal way.

FIG. 4 is a diagram illustrating an example of the removal amount.

FIG. 5 is a diagram illustrating an example of syntax.

FIG. 14 is a block diagram illustrating a main configuration example of a computer.

MODE FOR CARRYING OUT THE INVENTION

Figure 1:
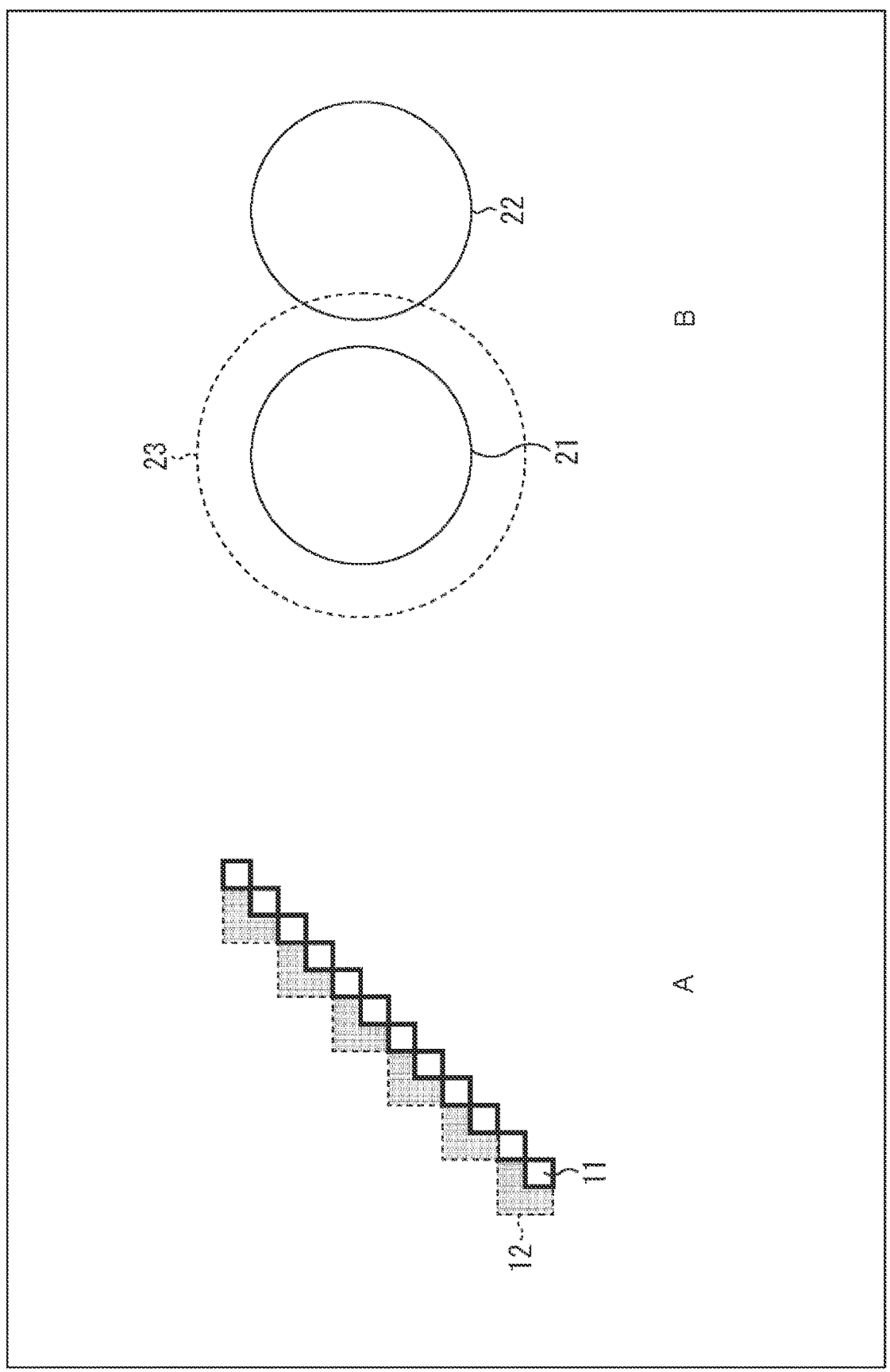
FIG. 1 is a diagram for explaining an example of the relation between a patch range indicated by an occupancy map and an actual patch range.

The following description will explain modes (which will be hereinafter referred to as embodiments) for carrying out the present disclosure. Note that the description will be given in the following order.
1. Correction of 3D data reconstruction
2. First embodiment (coding device)
3. Second embodiment (decoding device)
4. Appendix

1. CORRECTION OF 3D DATA RECONSTRUCTION

<Documents or the Like that Support Technical Contents and Technical Terms>

The scope disclosed in the present technology includes not only the contents described in the embodiments but also contents described in the following Non-Patent Documents known at the time of filing.

Non-Patent Document 1: (described above)
Non-Patent Document 2: TELECOMMUNICATION STANDARDIZATION SECTOR OF ITU (International Telecommunication Union), "Advanced video coding for generic audiovisual services", H.264, April 2017
Non-Patent Document 3: TELECOMMUNICATION STANDARDIZATION SECTOR OF ITU (International Telecommunication Union), "High efficiency video coding", H.265, December 2016
Non-Patent Document 4: Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

That is, the contents described in the above-described Non-Patent Documents also function as the basis for determining the support requirements. For example, a case where the quad-tree block structure described in Non-Patent Document 3 and the quad tree plus binary tree (QTBT) block structure described in Non-Patent Document 4 are not directly described in an embodiment also falls within the scope of the disclosure of the present technology and shall meet the support requirements of the scope of the claims. Furthermore, a case where a technical term such as parsing, syntax, or semantics is also similarly not directly described in embodiments, for example, also falls within the scope of the disclosure of the present technology and shall meet the support requirements of the scope of the claims.

<Point Cloud>

Conventionally, there has been data such as a point cloud that represents a three-dimensional structure based on position information of a point group, attribute information, or the like. The point cloud has a relatively simple data structure and can express any three-dimensional structure with sufficient accuracy by using a sufficiently large number of points.

<Summary of Video-Based Approach>

A video-based approach of projecting the position information of such a point cloud or attribute information on a two-dimensional plane for each small area, arranging an image (patch) projected on the two-dimensional plane in the frame image, and coding the frame image with an image coding method for a two-dimensional image has been proposed.

In this video-based approach, the inputted point cloud is divided into a plurality of small areas, and each point is projected on a two-dimensional plane (patch is generated) for each small area. Since the point cloud is configured with position information (Geometry) of each point and attribute information (Texture), projection on the two-dimensional plane is performed for each of the position information and the attribute information.

Then, this patch is arranged in a frame image (two-dimensional image). That is, a frame image in which a patch of position information is arranged (which is also referred to as a geometry video frame) and a frame image in which a patch of attribute information is arranged (which is also referred to as a color video frame) are generated.

In the geometry video frame, note that the position information of the point is expressed as the position information (depth value (Depth)) in the depth direction. That is, each pixel value of the frame image indicates this depth value.

Each of these frame images is coded with a coding method for a two-dimensional plane image such as advanced video coding (AVC) or high efficiency video coding (HEVC), for example.

The coded data generated in this way is transmitted to the decoding side, and decoded on the decoding side to generate a frame image. Then, each patch is extracted from the frame image, and 3D data (point cloud, etc.) is reconstructed from each patch (position information and attribute information).

<Occupancy Map>

Moreover, an occupancy map can also be used in the case of such a video-based approach. The occupancy map is map information indicating presence or absence of a projected image (patch) of a geometry video frame with a predetermined pixel accuracy. For example, the occupancy map indicates presence or absence of a patch with N×N pixel accuracy, that is, for each area of N×N pixels. For example, in the occupancy map, an area of N×N pixels in which a patch exists is indicated by value "1", while an area of N×N pixels in which no patch exists is indicated by value "0".

Such an occupancy map is coded as data separate from the geometry video frame or the color video frame, and transmitted to the decoding side. Since the decoder can grasp whether it is in an area where a patch exists or not by referring to this occupancy map, it is possible to suppress the influence of noise and the like generated by coding/decoding and to restore 3D data more accurately. For example, even if the depth value changes due to coding/decoding, the decoder can ignore the depth value (does not process the depth value as the position information of 3D data) of the area where no patch exists by referring to the occupancy map.

In a case where such an occupancy map is used, the coding efficiency can be improved by lowering the resolution and reducing the amount of information.

However, if the resolution of the occupancy map is lowered, there has been a possibility that the patch range indicated by the occupancy map and the actual patch range may not coincide, and a point that is not originally present may be generated during reconstruction of 3D data. For example, when an occupancy map 12 with lower resolution is generated for a pixel 11 in the vicinity of the patch boundary of the position information indicated by a small square as illustrated in A of FIG. 1, there has been a possibility that the patch may spread, and blank that is an area where originally no patch exists (the part shown in gray in A of FIG. 1) may be formed. Thus, a method of moving the position of such a point by performing smoothing to reduce blank has been considered. However, even if smoothing is performed, there has been a possibility that the peak signal-to-noise ratio (PSNR) may deteriorate.

Thus, a method of removing the blank part formed by lowering the resolution (N×N accuracy) of the occupancy map has been considered as described in Non-Patent Document 5. However, although the blank part can be removed with the method described in Non-Patent Document 5, the blank part cannot be increased (expanded), and it has been difficult to reduce a hole (missing part) formed in the display image due to a gap between patches or the like. Rather, since the overlapping of patches is suppressed by reducing the blank part, there has been a possibility that a gap between patches or the like is likely to be formed.

Thus, a method of widening the boundary of a high-resolution occupancy map (1×1 accuracy) has also been considered as described in Non-Patent Document 6. However, there has been a possibility that the occupancy map with 1×1 accuracy may increase the amount of information as described above.

Thus, it is conceivable to reduce the blank part at the patch boundary part as in the method described in Non-Patent Document 5, and further widen the boundary as in the method described in Non-Patent Document 6. However, since the occupancy map is corrected in the methods described in Non-Patent Document 5 and Non-Patent Document 6, there has been a possibility that another patch may be included in an area indicating the existence of one patch, and the reconstructed 3D data may deteriorate. For example, in a case where the positions of a patch 21 and a patch 22 are close to each other as shown in B of FIG. 1, an area where the patch 21 exists is superimposed with the patch 22 as shown by a dotted circle 23 when the area in the occupancy map is enlarged. In such a case, since the dotted circle 23 is cut out as an area where the patch 21 exists, there has been a possibility that the 3D data reconstructed from the patch 21 may include the information of the patch 22. Therefore, there has been a possibility that the subjective image quality of the image (which will also be referred to as a display image) obtained by projecting the reconstructed 3D data on a two-dimensional plane may lower.

In addition, since the method described in Non-Patent Document 6 does not support smoothing, it has been difficult to suppress formation of a gap between patches due to the movement of the point position by smoothing. Therefore, there has been a possibility that the gap may lower the subjective image quality of the display image.

<Method 1>

Thus, correction is performed in the conversion from 2D data to 3D data (reconstruction of 3D data) as in Method 1 in the table of FIG. 2, so as to suppress formation or the like of a hole due to a gap between patches or the like. For example, correction information that is information regarding correction of 3D data representing a three-dimensional structure constructed using 2D data representing a two-dimensional image is generated, and the generated correction information is coded. For example, an image processing device includes: a correction information generation unit that generates correction information that is information regarding correction of 3D data representing a three-dimensional structure constructed using 2D data representing a two-dimensional image; and a correction information coding unit that codes correction information generated by the correction information generation unit.

Furthermore, for example, coded data of correction information that is information regarding correction of 3D data representing a three-dimensional structure constructed using 2D data representing a two-dimensional image is decoded, and 3D data is constructed using the 2D data and correction information generated by decoding coded data of the correction information. For example, the image processing device includes: a correction information decoding unit that decodes coded data of correction information that is information regarding correction of 3D data representing a three-dimensional structure constructed using 2D data representing a two-dimensional image; and a construction unit that constructs 3D data by using the 2D data and correction information generated by decoding coded data of correction information by the correction information decoding unit.

In this way, correction of the patch boundary can be realized by correction of 3D data. Accordingly, it is possible to suppress deterioration of 3D data, such as addition of information on other patches during reconstruction of 3D data from a patch to be processed, as in the case of correcting the occupancy map. That is, it is possible to suppress lowering of the subjective image quality of the display image.

This correction information may be generated on the basis of an occupancy map with 1×1 accuracy and an occupancy map with N×N accuracy. For example, the occupancy map is reduced in accuracy from 1×1 accuracy to N×N accuracy and coded, and the correction information is generated on the basis of the occupancy map with 1×1 accuracy before coding, and the occupancy map with N×N accuracy generated by decoding the coded data of the occupancy map. By reducing the occupancy map in accuracy and coding the occupancy map in this way, it is possible to suppress lowering of the coding efficiency. Furthermore, the smoothing performed during coding can be reflected in the correction information by generating the correction information by using the occupancy map before and after the coding. Accordingly, it is possible to suppress lowering of the subjective image quality of the display image due to smoothing.

Moreover, the correction information may be further generated on the basis of the remainder amount that is a set value of the size of the blank that is a part of the 3D data enlarged by the occupancy map. In this way, the correction amount of the blank can also be controlled by the set value "remainder amount". For example, depending on 3D data, a missing part that is difficult to deal with by comparing the occupancy maps before and after simple coding can be formed in the display image. Thus, it is possible to suppress formation of such a missing part by setting the remainder amount independently of the comparison result of the occupancy map. That is, it is possible to further suppress lowering of the subjective image quality of the display image. Note that the method of setting this remainder amount is arbitrary. For example, this remainder amount may be set on the basis of an instruction from the outside such as a user, may be set on the basis of the analysis result of 3D data to be coded, or may be set on the basis of other information.

Moreover, the correction information may include information regarding correction of blank that is a part of the 3D data enlarged by the occupancy map. In this way, correction of blank can be reflected in correction of 3D data on the basis of this correction information. That is, correction of the patch boundary can be realized by correction of 3D data. Accordingly, it is possible to suppress lowering of the subjective image quality of the display image.

<Method 1-1>

For example, the information regarding correction of this blank may include information indicating the removal way of the blank (information indicating how to remove the blank). That is, the correction method may be transmitted as in method 1-1 illustrated in the table of FIG. 2. By putting such information in the correction information, it is possible to control how to remove the blank.

Furthermore, the information indicating the removal way of this blank may have any content, and may include, for example, information indicating a pattern of the removal way of blank selected from candidates. For example, a plurality of "patterns of removal way of blank" may be prepared in advance as candidates, a "pattern of removal way of blank" may be selected from the candidates for each local area, and correction information (information indicating removal way of blank) may include information indicating selected candidate (e.g., identification information of selected candidate, etc.) for each local area. By putting such information in the correction information, it is possible to control how to remove the blank by simpler information. It is possible to suppress an increase in the amount of code as compared with the case where the removal way of all local areas is concretely specified in units of one pixel, for example.

<Method 1-2>

Furthermore, for example, information regarding correction of the blank may include information indicating the correction amount of the blank (information indicating how much the blank is to be corrected). That is, the correction amount may be transmitted as in method 1-2 illustrated in the table of FIG. 2. By putting such information in the correction information, it is possible to control how much blank is to be corrected.

Note that the information indicating the correction amount of the blank may include information indicating the removal amount of blank. With such information, it is possible to control how much blank is to be removed. Furthermore, the information indicating the correction amount of the blank may include information indicating the increase amount of blank. With such information, it is possible to control how much blank is to be increased (thickened).

<Method 1-3 and Method 1-4>

Furthermore, the accuracy of the occupancy map used for reconstructing 3D data to be corrected on the basis of the correction information on the decoding side is arbitrary. For example, N×N accuracy may be employed. That is, conversion (reconstruction of 3D data) that uses an occupancy map with N×N accuracy may be corrected as in method 1-3 illustrated in the table of FIG. 2. Furthermore, 1×1 accuracy may be employed. That is, conversion (reconstruction of 3D data) that uses an occupancy map with 1×1 accuracy may be corrected as in method 1-4 illustrated in the table of FIG. 2.

<Pattern of Removal Way of Blank>

Next, a candidate of a "pattern of removal way of blank" explained in <Method 1-1> will be described. The pattern (removal way) to be a candidate may be any pattern. The number is also arbitrary. For example, eight patterns as illustrated in A of FIG. 3 to H of FIG. 3 may be candidates.

A of FIG. 3 to H of FIG. 3 each illustrate examples of a pattern of the removal way of blank. In each of A of FIG. 3 to H of FIG. 3, each square indicates a block (e.g., pixel) as a data unit of the occupancy map, and a black block is a block to be removed from the blank. That is, this black block is an empty block, that is, a block for which a value indicating that no patch exists is set.

For example, A of FIG. 3 illustrates a pattern in which the lower right corner of the local part to be processed is removed. Similarly, B of FIG. 3 illustrates a pattern in which the upper right is removed, C of FIG. 3 illustrates a pattern in which the upper left is removed, and D of FIG. 3 illustrates a pattern in which the lower left is removed.

Furthermore, for example, E of FIG. 3 illustrates a pattern in which the right side of the local part to be processed is removed, F of FIG. 3 illustrates a pattern in which the upper side is removed, G of FIG. 3 illustrates a pattern in which the left side is removed, and H of FIG. 3 illustrates a pattern in which the lower side is removed. Note that a gray block in the figure is a completely occupied block or an empty block.

That is, in the case of this example, which part is to be removed is selected depending on which candidate is selected.

<Correction Amount of Blank>

Next, the "removal amount of blank" explained in <Method 1-2> will be described. The removal amount of this blank may be any value. For example, in the case of the pattern in which the right side is removed (pattern in E of FIG. 3) illustrated in A of FIG. 4 and in a case where the correction amount of blank of the area to be processed (current area) including 4×4 pixels is "0" (i.e., initial value (Default)), the right half pixels (2×4 pixel area on the right side) is removed as illustrated in B of FIG. 4. Similarly, in a case where the correction amount of blank is "−1", the rightmost pixel string (rightmost 1×4 pixel area) of the current area is removed as illustrated in C of FIG. 4. Similarly, in a case where the correction amount of blank is "−2", the current area is not corrected (the rightmost 0x4 pixel area is removed) as illustrated in D of FIG. 4. Furthermore, in a case where the correction amount of blank is "−3", a 1×4 pixel area is added to the right end of the current area as illustrated in E of FIG. 4. That is, the blank is expanded.

In this way, the correction amount of blank can indicate the removal amount of blank or the increase amount of blank.

<Syntax>

An example of syntax for the above correction information is illustrated in A of FIG. 5. The gray part is the syntax related to correction information. The frame level, the removal way (type) of blank of the patch level, and processing for each type are signaled by omapFilterTypeFrameLevel/omapFilterTypePatchLevel. Furthermore, the frame level and the correction amount (amount to be removed/increased) for each patch are signaled by omapFilterValueFrameLevel/patchList[i].omapFilterValue. This value may be used as an index representing the difference from the initial value (Default) as shown in the conversion table illustrated in B of FIG. 5.

2. FIRST EMBODIMENT

<Coding Device>

Figure 6:
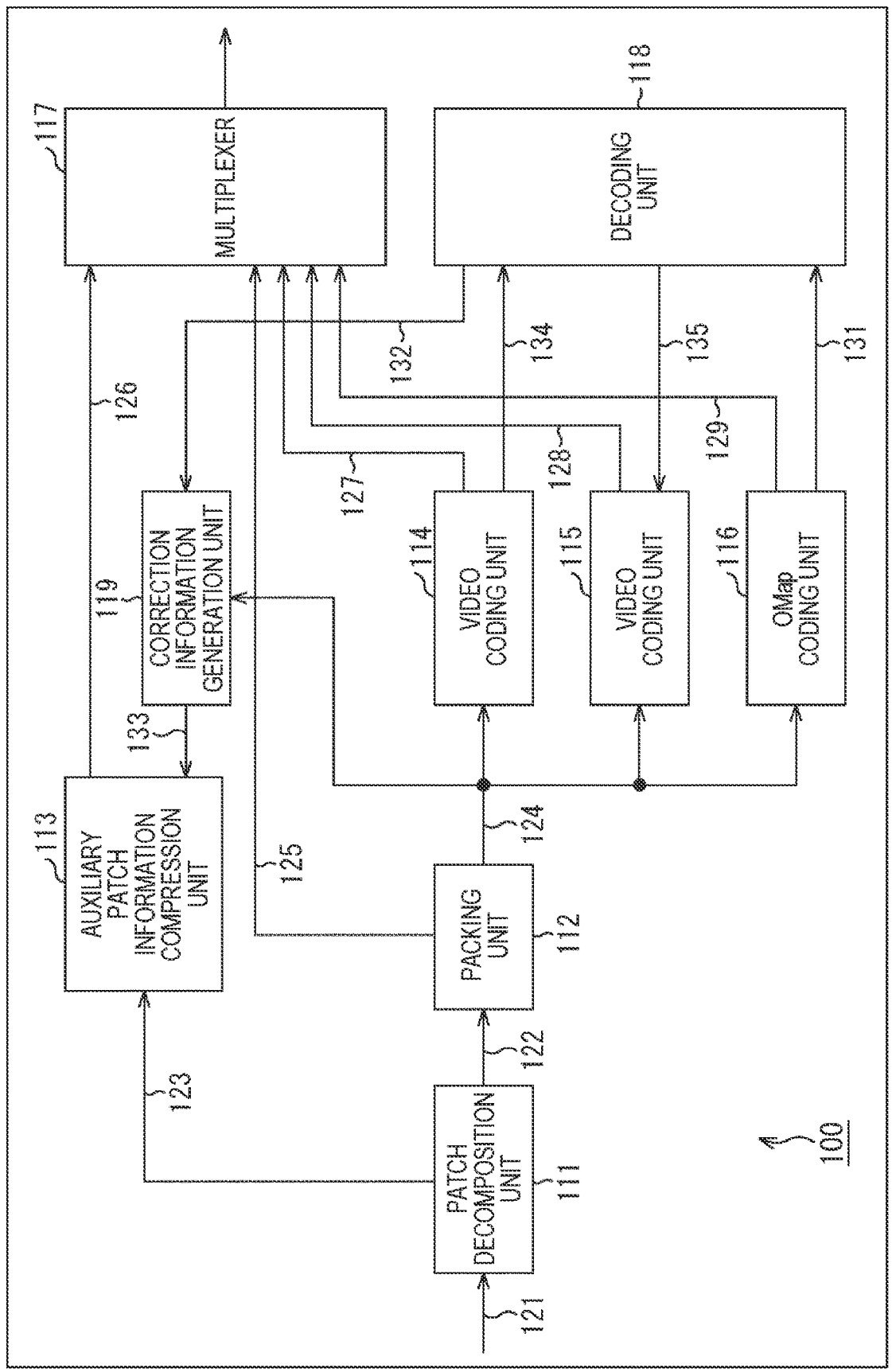
FIG. 6 is a block diagram illustrating a main configuration example of a coding device.

FIG. 6 is a block diagram illustrating an example of the configuration of a coding device that is an aspect of an image processing device to which the present technology is applied. A coding device 100 illustrated in FIG. 6 is a device (a coding device to which a video-based approach is applied) that projects 3D data such as a point cloud on a two-dimensional plane and codes it with a coding method for a two-dimensional image.

Note that FIG. 6 illustrates a main processing unit, main data flow, and the like, and may not illustrate all. That is, in the coding device 100, there may be a processing unit that is not shown as a block in FIG. 6, or there may be processing or data flow that is not shown as an arrow or the like in FIG. 6. This is similar in other figures for explaining the processing unit and the like in the coding device 100.

As illustrated in FIG. 6, the coding device 100 includes a patch decomposition unit 111, a packing unit 112, an auxiliary patch information compression unit 113, a video coding unit 114, a video coding unit 115, an OMap coding unit 116, a multiplexer 117, a decoding unit 118, and a correction information generation unit 119.

The patch decomposition unit 111 performs processing related to decomposition of 3D data. For example, the patch decomposition unit 111 acquires 3D data (e.g., point cloud) representing a three-dimensional structure inputted to the coding device 100 (arrow 121). Furthermore, the patch decomposition unit 111 decomposes the acquired 3D data into a plurality of small areas (connection components), projects the 3D data on a two-dimensional plane for each small area, and generates a patch of position information or a patch of attribute information.

The patch decomposition unit 111 supplies information regarding each generated patch to the packing unit 112 (arrow 122). Furthermore, the patch decomposition unit 111 supplies auxiliary patch information that is information regarding the decomposition to the auxiliary patch information compression unit 113 (arrow 123).

The packing unit 112 performs processing related to data packing. For example, the packing unit 112 acquires information regarding the patch supplied from the patch decomposition unit 111 (arrow 122). Furthermore, the packing unit 112 arranges each acquired patch on a two-dimensional image and packs it as a video frame. For example, the packing unit 112 packs a patch of position information (Geometry) indicating the position of a point as a video frame, and generates (a) geometry video frame(s). Furthermore, the packing unit 112 packs a patch of attribute information (Texture) such as color information added to the position information as a video frame, and generates (a) color video frame(s). Moreover, the packing unit 112 generates an occupancy map with 1×1 accuracy indicating presence or absence of patches.

The packing unit 112 supplies them to the subsequent processing units (arrow 124). For example, the packing unit 112 supplies a geometry video frame to the video coding unit 114, supplies a color video frame to the video coding unit 115, and supplies the occupancy map with 1×1 accuracy (1×1 Omap) to the OMap coding unit 116. Furthermore, the packing unit 112 supplies control information regarding the packing to the multiplexer 117 (arrow 125). Moreover, the packing unit 112 supplies the occupancy map with 1×1 accuracy to the correction information generation unit 119.

The auxiliary patch information compression unit 113 performs processing related to compression of auxiliary patch information. For example, the auxiliary patch information compression unit 113 acquires the auxiliary patch information supplied from the patch decomposition unit 111 (arrow 123). Furthermore, the auxiliary patch information compression unit 113 acquires the correction information supplied from the correction information generation unit 119 (arrow 133). The auxiliary patch information compression unit 113 codes (compresses) the acquired auxiliary patch information and generates coded data of the auxiliary patch information. Furthermore, the auxiliary patch information compression unit 113 codes (compresses) the acquired correction information to generate coded data of the correction information, and puts the coded data of the correction information in the coded data of the auxiliary patch information. The auxiliary patch information compression unit 113 supplies the coded data of the auxiliary patch information generated in this way to the multiplexer 117 (arrow 126).

The video coding unit 114 performs processing related to coding of the geometry video frame. For example, the video coding unit 114 acquires the geometry video frame supplied from the packing unit 112 (arrow 124). Furthermore, the video coding unit 114 codes the acquired geometry video frame with any coding method for a two-dimensional image such as AVC or HEVC, for example, and generates coded data of the geometry video frame. The video coding unit 114 supplies the coded data of the generated geometry video frame to the multiplexer 117 (arrow 127). Furthermore, the video coding unit 114 supplies the coded data of the geometry video frame to the decoding unit 118 (arrow 134).

The video coding unit 115 performs processing related to coding of a color video frame. For example, the video coding unit 115 acquires a color video frame supplied from the packing unit 112 (arrow 124). Furthermore, the video coding unit 115 acquires a decoded geometry video frame supplied from the decoding unit 118 (arrow 135). Then, the video coding unit 115 recolors the acquired color video frame by using the acquired geometry video frame, and makes the attribute information correspond to the position information after decoding. That is, the video coding unit 115 associates the attribute information with the position information updated by smoothing in coding. Furthermore, the video coding unit 115 codes the color video frame recolored in this way with any coding method for a two-dimensional image such as AVC or HEVC, for example, and generates coded data of the color video frame. The video coding unit 115 supplies the coded data of the generated color video frame to the multiplexer 117 (arrow 128).

The OMap coding unit 116 performs processing related to coding of a video frame of the occupancy map. For example, the OMap coding unit 116 acquires an occupancy map with 1×1 accuracy supplied from the packing unit 112 (arrow 124). The OMap coding unit 116 reduces the acquired occupancy map with 1×1 accuracy in accuracy and generates an occupancy map with N×N accuracy. Then, the OMap coding unit 116 codes the generated occupancy map with N×N accuracy with any coding method such as arithmetic coding, for example, and generates coded data of the occupancy map with N×N accuracy. Furthermore, the OMap coding unit 116 supplies the coded data of the generated occupancy map with N×N accuracy to the multiplexer 117 (arrow 129). Moreover, the OMap coding unit 116 also supplies the coded data to the decoding unit 118 (arrow 131).

The multiplexer 117 performs processing related to multiplexing. For example, the multiplexer 117 acquires coded data of the auxiliary patch information supplied from the auxiliary patch information compression unit 113 (arrow 126). Furthermore, for example, the multiplexer 117 acquires control information regarding packing supplied from the packing unit 112 (arrow 125). Furthermore, for example, the multiplexer 117 acquires coded data of the geometry video frame supplied from the video coding unit 114 (arrow 127). Furthermore, for example, the multiplexer 117 acquires coded data of the color video frame supplied from the video coding unit 115 (arrow 128). Furthermore, for example, the multiplexer 117 acquires coded data of the occupancy map supplied from the OMap coding unit 116 (arrow 129).

The multiplexer 117 multiplexes the acquired information to generate a bit stream. The multiplexer 117 outputs the generated bit stream to the outside of the coding device 100.

The decoding unit 118 performs processing related to decoding of the coded data generated as described above. For example, the decoding unit 118 acquires coded data of the occupancy map with N×N accuracy supplied from the OMap coding unit 116 (arrow 131). Furthermore, the decoding unit 118 acquires coded data of the geometry video frame supplied from the video coding unit 114 (arrow 134). Then, the decoding unit 118 has a configuration similar to that of the decoding device 200 described later, and performs similar processing. For example, the decoding unit 118 decodes the coded data of the occupancy map with N×N accuracy and generates the occupancy map with N×N accuracy. The decoding unit 118 supplies the occupancy map with N×N accuracy to the correction information generation unit 119 (arrow 132). Furthermore, the decoding unit 118 decodes the coded data of the geometry video frame and generates the geometry video frame. The decoding unit 118 supplies the geometry video frame to the video coding unit 115 (arrow 135).

The correction information generation unit 119 performs processing related to generation of correction information that is information regarding correction of 3D data representing a three-dimensional structure reconstructed using 2D data representing a two-dimensional image. For example, the correction information generation unit 119 acquires an occupancy map with 1×1 accuracy supplied from the packing unit 112 (arrow 124). Furthermore, the correction information generation unit 119 acquires an occupancy map with N×N accuracy supplied from the decoding unit 118 (arrow 132). Moreover, the correction information generation unit 119 acquires the setting of the remainder amount to be inputted from the outside (e.g., user, etc.) (not shown). The correction information generation unit 119 generates correction information on the basis of the information. For example, the correction information generation unit 119 generates correction information including information regarding correction of blank that is a part of 3D data enlarged by an occupancy map. The correction information generation unit 119 supplies the generated correction information to the auxiliary patch information compression unit 113 (arrow 133).

In this way, the coding device 100 can cause the decoding side to correct the 3D data on the basis of this correction information. Therefore, deterioration of 3D data can be suppressed, and lowering of the subjective image quality of the display image can be suppressed.

Note that these processing units (from patch decomposition unit 111 to correction information generation unit 119) have any configuration. For example, each processing unit may be configured with a logical circuit that realizes the above-described processing. Furthermore, each processing unit may have, for example, a central processing unit (CPU), a read only memory (ROM), a random access memory (RAM), or the like, and use the same for executing a program so as to realize the above-described processing. Of course, each processing unit may have both configurations, and a part of the above-described processing may be realized by a logical circuit while the other may be realized by executing a program. The configurations of the respective processing units may be independent of each other, and, for example, a part of the above-described processing may be realized by a logical circuit of some processing units, the above-described processing may be realized by some other processing units executing a program, and the above-described processing may be realized by yet other processing units executing both a logical circuit and a program.

<Correction Information Generation Unit>

Figure 7:
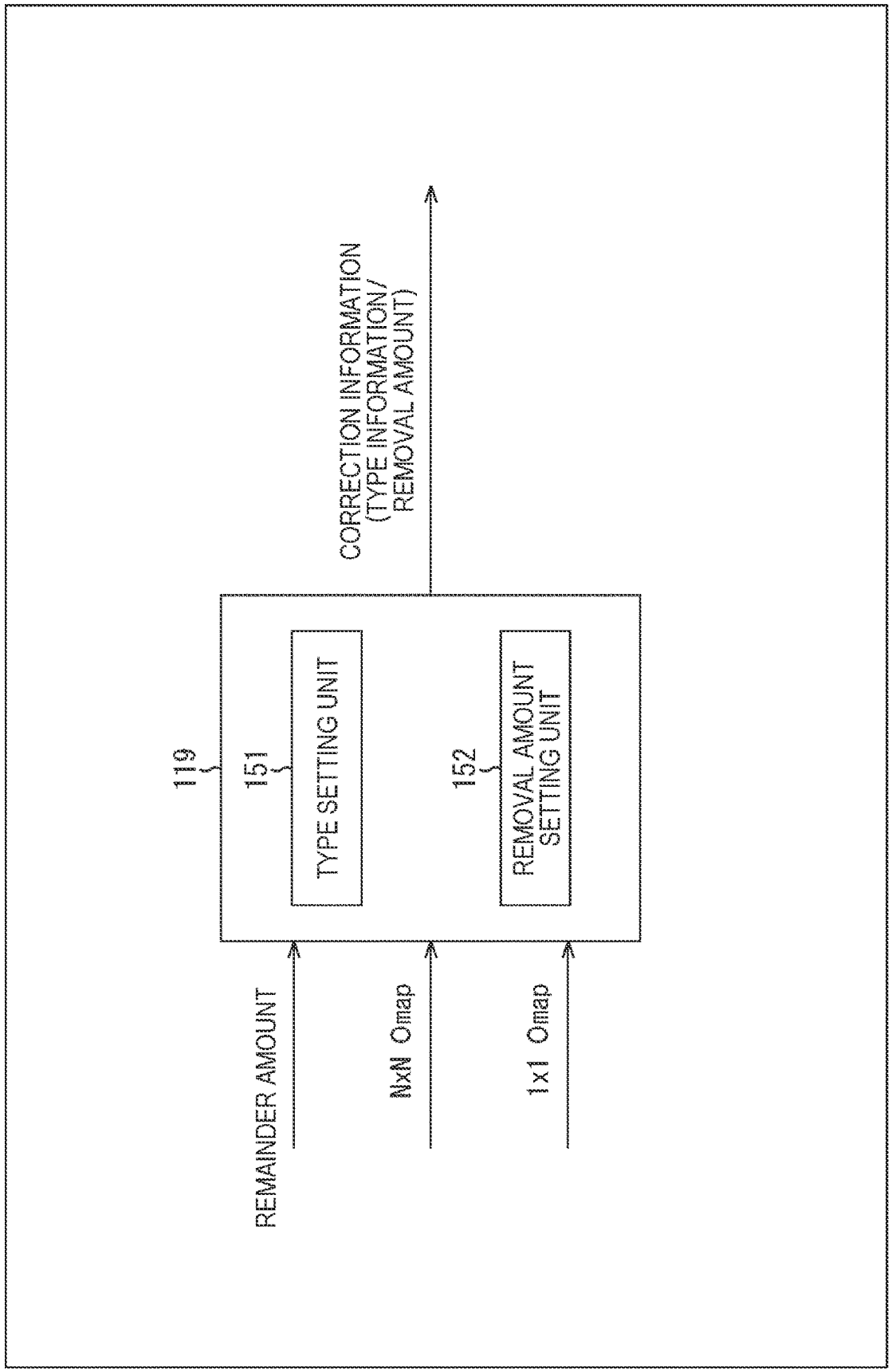
FIG. 7 is a block diagram illustrating a main configuration example of a correction information generation unit.

FIG. 7 is a block diagram illustrating a main configuration example of the correction information generation unit 119. As illustrated in FIG. 7, the correction information generation unit 119 has a type setting unit 151 and a removal amount setting unit 152.

The type setting unit 151 sets the removal way of blank (correction type of blank). For example, the type setting unit 151 selects an optimum pattern from candidates of "pattern of removal way of blank" prepared in advance. For example, the type setting unit 151 selects such a pattern (selects a type) on the basis of the comparison result of the occupancy map as described above or the setting of the remainder amount.

The removal amount setting unit 152 sets the correction amount of blank (how much blank is to be corrected). For example, the removal amount setting unit 152 sets the removal amount of blank (how much blank is to be removed). Furthermore, for example, the removal amount setting unit 152 sets the increase amount of blank (how much blank is to be increased). The removal amount setting unit 152 sets such a correction amount on the basis of the comparison result of the occupancy map as described above or the setting of the remainder amount.

The correction information generation unit 119 supplies information indicating the correction type or correction amount of blank set as described above to the auxiliary patch information compression unit 113 as correction information.

<Flow of Coding Processing>

Processing to be executed by such a coding device 100 will be described. First, an example of the flow of coding processing will be described with reference to the flowchart of FIG. 8.

When the coding processing is started, the patch decomposition unit 111 of the coding device 100 executes patch decomposition processing, decomposes 3D data into patches, and projects the data of each patch on a two-dimensional plane, in step S101.

In step S102, the packing unit 112 packs the 3D data projected on the two-dimensional plane for each patch by the patch decomposition unit 111, and generates a geometry video frame or a color video frame. Furthermore, the packing unit 112 generates an occupancy map with 1×1 accuracy.

In step S103, the OMap coding unit 116 reduces the occupancy map with 1×1 accuracy generated in step S102 in accuracy to generate an occupancy map with N×N accuracy, and codes the occupancy map with N×N accuracy to generate coded data of the occupancy map with N×N accuracy.

In step S104, the decoding unit 118 decodes the coded data of the occupancy map with N×N accuracy generated in step S103 and generates an occupancy map with N×N accuracy.

In step S105, the correction information generation unit 119 executes correction information generation processing, and generates correction information on the basis of the occupancy map with 1×1 accuracy generated in step S102, the occupancy map with N×N accuracy after decoding generated in step S104, and the remainder amount. This correction information generation processing will be described later.

In step S106, the packing unit 112 dilates the geometry video frame generated in step S102.

In step S107, the video coding unit 114 codes the geometry video frame dilated in step S106 and generates coded data of the geometry video frame.

In step S108, the video coding unit 114 decodes the coded data of the geometry video frame generated in step S107 and generates a geometry video frame after decoding.

In step S109, the packing unit 112 dilates the color video frame generated in step S102.

In step S110, the video coding unit 115 recolors the color video frame dilated in step S109 by using the geometry video frame after decoding generated in step S108, and makes the attribute information correspond to the position information after decoding.

In step S111, the video coding unit 115 codes the color video frame recolored in step S110 and generates coded data of the color video frame.

In step S112, the auxiliary patch information compression unit 113 codes (compresses) the auxiliary patch information including the correction information generated by the process of step S105, and generates coded data.

In step S113, the multiplexer 117 multiplexes various information generated as described above and generates a bit stream including the information. In step S114, the multiplexer 117 outputs the bit stream generated by the process of step S113 to the outside of the coding device 100. When the process of step S113 is completed, the coding processing is completed.

<Flow of Correction Information Generation Processing>

An example of the flow of correction information generation processing to be executed in step S105 of FIG. 8 will be described with reference to the flowchart of FIG. 9. When the correction information generation processing is started, the type setting unit 151 of the correction information generation unit 119 sets the correction type of blank in step S131. In step S132, the removal amount setting unit 152 sets the correction amount (e.g., removal amount) of blank. In step S133, the correction information generation unit 119 sets such information as correction information and supplies the information to the auxiliary patch information compression unit 113.

Figure 8:
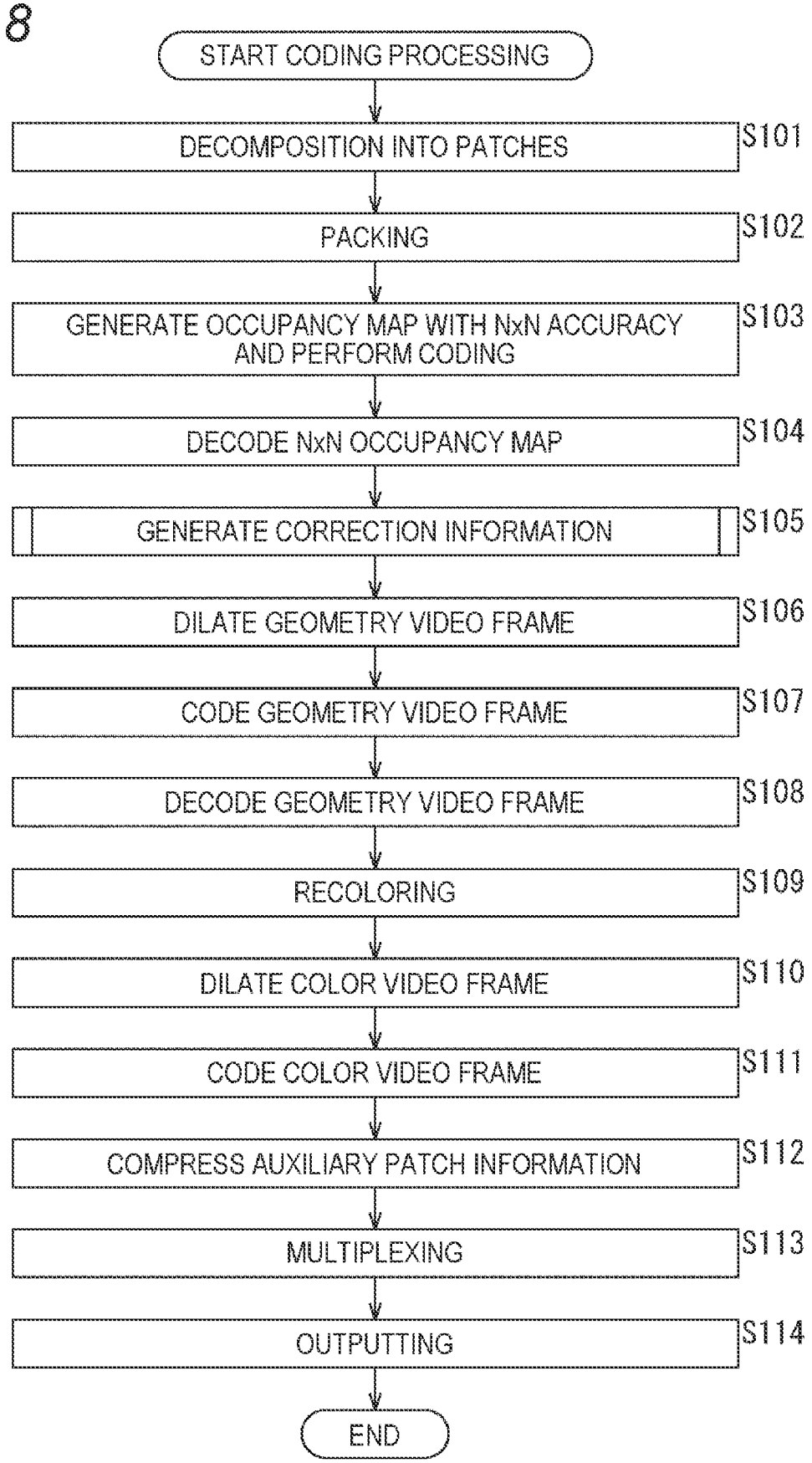
FIG. 8 is a flowchart for explaining an example of the flow of coding processing.
Figure 9:
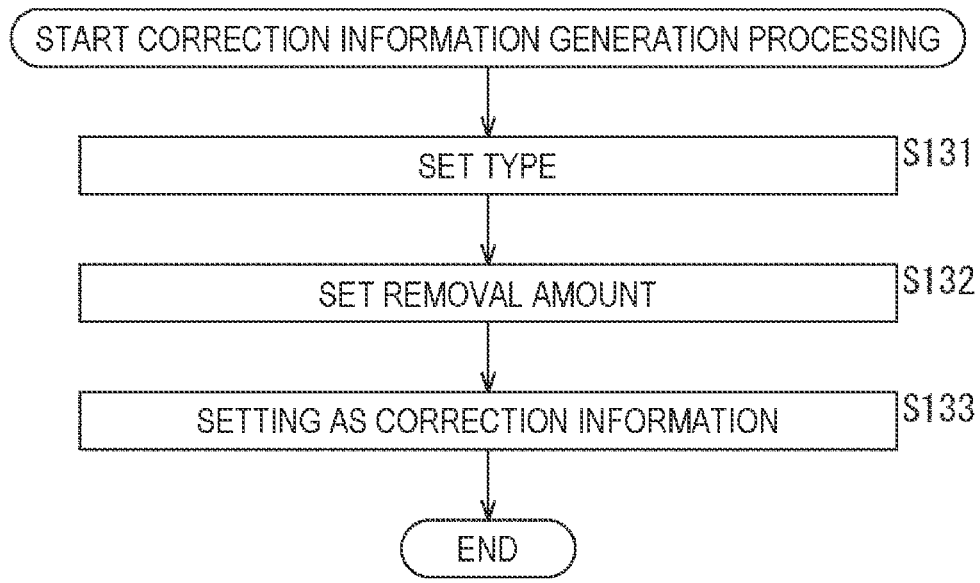
FIG. 9 is a flowchart for explaining an example of the flow of correction information generation processing.

When the process of step S133 is completed, the correction information generation processing is completed, and the process returns to FIG. 8.

By executing each process as described above, the coding device 100 can generate correction information of 3D data and cause the decoding side to correct the 3D data on the basis of the correction information. Therefore, deterioration of 3D data can be suppressed, and lowering of the subjective image quality of the display image can be suppressed.

3. SECOND EMBODIMENT

<Decoding Device>

Figure 10:
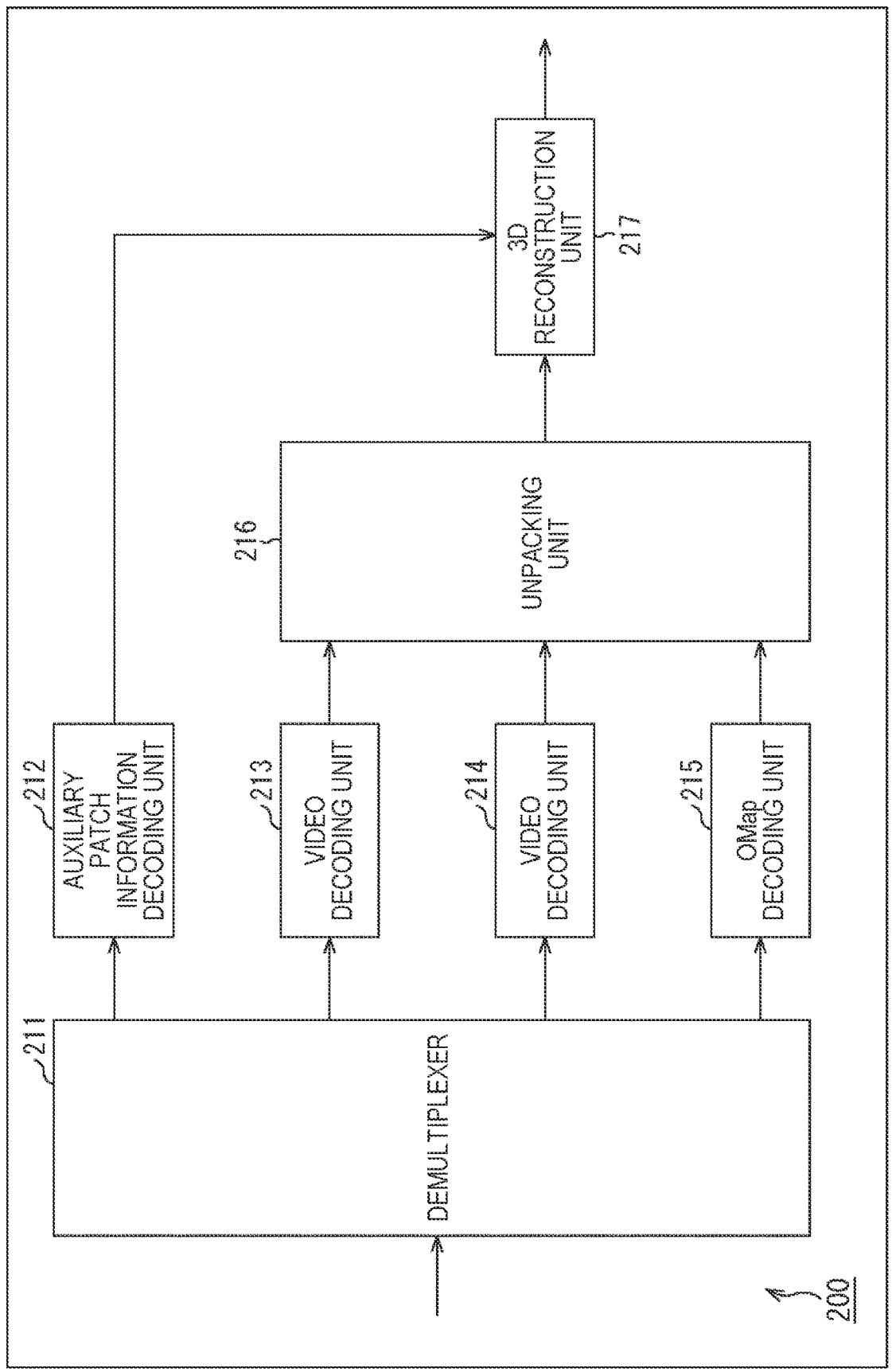
FIG. 10 is a block diagram illustrating a main configuration example of a decoding device.

FIG. 10 is a block diagram illustrating an example of the configuration of a decoding device that is an aspect of an image processing device to which the present technology is applied. A decoding device 200 illustrated in FIG. 10 is a device (a decoding device to which a video-based approach is applied) that decodes the coded data obtained by projecting 3D data such as a point cloud on a two-dimensional plane with a decoding method for a two-dimensional image and reconstructs 3D data. This decoding device 200 is a decoding device corresponding to the coding device 100 in FIG. 6, and can decode the bit stream generated by the coding device 100 to reconstruct 3D data.

Note that FIG. 10 illustrates main processing unit, main data flow, and the like, and may not illustrate all. That is, in the decoding device 200, there may be a processing unit that is not shown as a block in FIG. 10, or there may be processing or data flow that is not shown as an arrow or the like in FIG. 10. This is similar in other figures for explaining the processing unit and the like in the decoding device 200.

As illustrated in FIG. 10, the decoding device 200 includes a demultiplexer 211, an auxiliary patch information decoding unit 212, a video decoding unit 213, a video decoding unit 214, an OMap decoding unit 215, an unpacking unit 216, and a 3D reconstruction unit 217.

The demultiplexer 211 performs processing related to data demultiplexing. For example, the demultiplexer 211 acquires a bit stream inputted to the decoding device 200. This bit stream is supplied from, for example, the coding device 100. The demultiplexer 211 demultiplexes this bit stream, extracts coded data of the auxiliary patch information, and supplies it to the auxiliary patch information decoding unit 212. Furthermore, the demultiplexer 211 extracts coded data of the geometry video frame from the bit stream by demultiplexing and supplies it to the video decoding unit 213. Moreover, the demultiplexer 211 extracts coded data of the color video frame from the bit stream by demultiplexing and supplies it to the video decoding unit 214. Furthermore, the demultiplexer 211 extracts coded data of an occupancy map from the bit stream by demultiplexing and supplies it to the OMap decoding unit 215. Furthermore, the demultiplexer 211 extracts control information regarding packing from the bit stream by demultiplexing and supplies it to the unpacking unit 216.

The auxiliary patch information decoding unit 212 performs processing related to decoding of the coded data of the auxiliary patch information (including coded data of the correction information). For example, the auxiliary patch information decoding unit 212 acquires coded data of the auxiliary patch information supplied from the demultiplexer 211. Furthermore, the auxiliary patch information decoding unit 212 decodes the coded data and generates auxiliary patch information or correction information. This correction information is information generated on the coding side and transmitted from the coding side, and includes, for example, information regarding correction of blank that is a part of 3D data enlarged by an occupancy map. The auxiliary patch information decoding unit 212 supplies the auxiliary patch information to the 3D reconstruction unit 217.

The video decoding unit 213 performs processing related to decoding of the coded data of the geometry video frame. For example, the video decoding unit 213 acquires coded data of the geometry video frame supplied from the demultiplexer 211. Furthermore, for example, the video decoding unit 213 decodes the coded data and generates a geometry video frame. The video decoding unit 213 supplies the geometry video frame to the unpacking unit 216.

The video decoding unit 214 performs processing related to decoding of the coded data of the color video frame. For example, the video decoding unit 214 acquires coded data of the color video frame supplied from the demultiplexer 211. Furthermore, for example, the video decoding unit 214 decodes the coded data and generates a color video frame. The video decoding unit 214 supplies the color video frame to the unpacking unit 216.

The OMap decoding unit 215 performs processing related to decoding of the coded data of the occupancy map. For example, the OMap decoding unit 215 acquires coded data of the occupancy map supplied from the demultiplexer 211. Furthermore, for example, the OMap decoding unit 215 decodes the coded data and generates an occupancy map. The OMap decoding unit 215 supplies the occupancy map to the unpacking unit 216.

The unpacking unit 216 performs processing related to unpacking. For example, the unpacking unit 216 acquires control information regarding packing supplied from the demultiplexer 211. Furthermore, the unpacking unit 216 acquires a geometry video frame supplied from the video decoding unit 213. Moreover, the unpacking unit 216 acquires a color video frame supplied from the video decoding unit 214. Furthermore, the unpacking unit 216 acquires an occupancy map supplied from the OMap decoding unit 215. The unpacking unit 216 unpacks a geometry video frame or a color video frame on the basis of the acquired control information or occupancy map, and extracts a patch or the like of the position information or the attribute information. The unpacking unit 216 supplies the patch or the like of the position information or the attribute information to the 3D reconstruction unit 217.

The 3D reconstruction unit 217 performs processing related to reconstruction of 3D data. For example, the 3D reconstruction unit 217 acquires auxiliary patch information and correction information supplied from the auxiliary patch information decoding unit 212. Furthermore, the 3D reconstruction unit 217 acquires a patch or the like of position information or attribute information supplied from the unpacking unit 216. Moreover, the 3D reconstruction unit 217 reconstructs 3D data (e.g., point cloud) on the basis of such information. For example, the 3D reconstruction unit 217 reconstructs 3D data on the basis of a patch or the like of the auxiliary patch information, the position information, or the attribute information, and further corrects the 3D data on the basis of the correction information. The 3D reconstruction unit 217 outputs the 3D data obtained by such processing to the outside of the decoding device 200.

This 3D data is, for example, supplied to a display unit so that an image is displayed, recorded on a recording medium, or supplied to another device via communication.

In this way, the decoding device 200 can correct the 3D data on the basis of the correction information supplied from the coding side. Therefore, deterioration of 3D data can be suppressed, and lowering of the subjective image quality of the display image can be suppressed.

Note that these processing units (from demultiplexer 211 to 3D reconstruction unit 217) have any configuration. For example, each processing unit may be configured with a logical circuit that realizes the above-described processing. Furthermore, each processing unit may have, for example, a CPU, a ROM, a RAM, or the like, and use the same to execute a program so as to realize the above-described processing. Of course, each processing unit may have both configurations, and a part of the above-described processing may be realized by a logical circuit while the other may be realized by executing a program. The configurations of the respective processing units may be independent of each other, and, for example, a part of the above-described processing may be realized by a logical circuit of some processing units, the above-described processing may be realized by some other processing units executing a program, and the above-described processing may be realized by yet other processing units executing both a logical circuit and a program.

<3D Reconstruction Unit>

Figure 11:
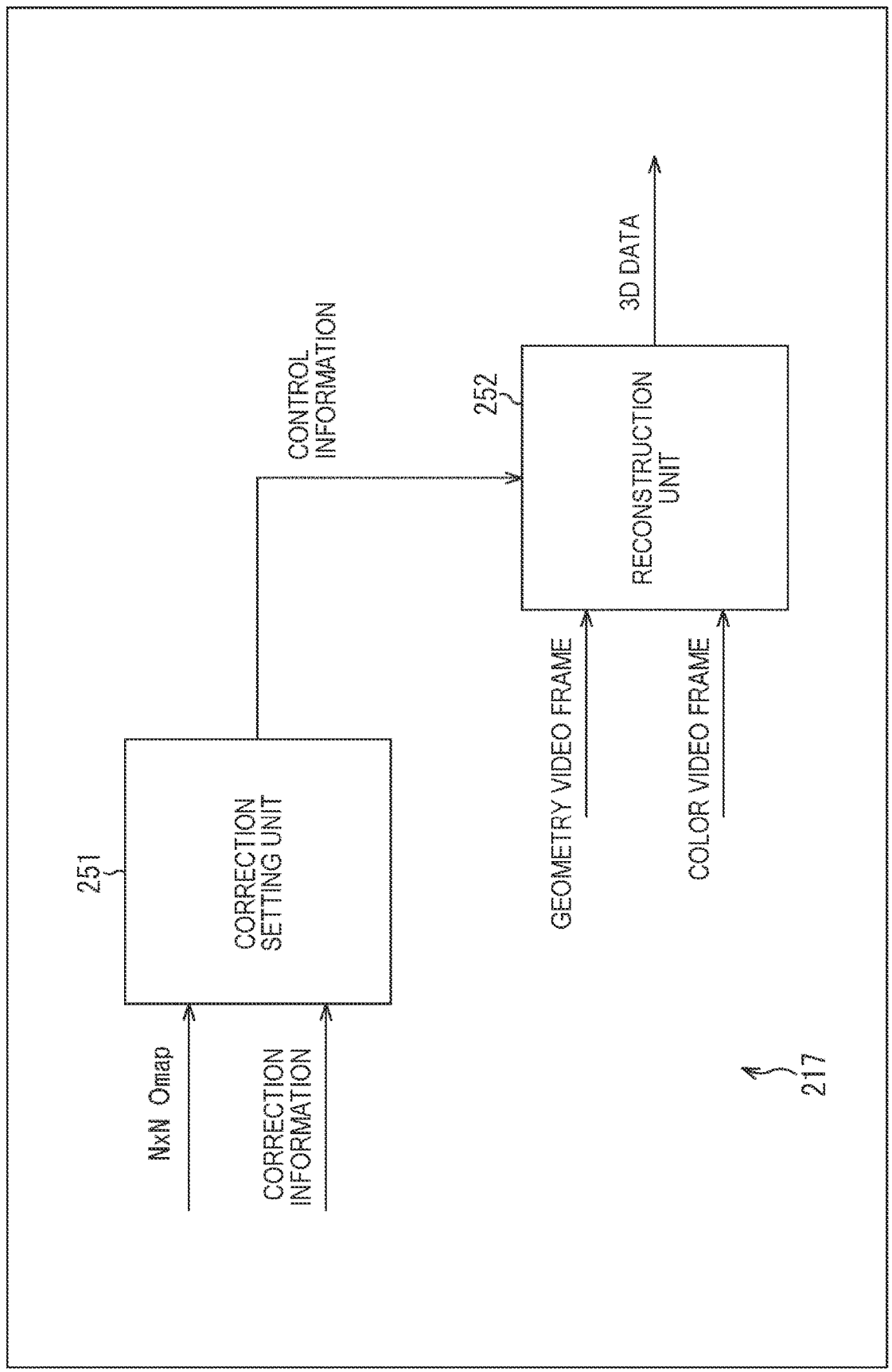
FIG. 11 is a block diagram illustrating a main configuration example of a 3D reconstruction unit.

FIG. 11 is a block diagram illustrating a main configuration example of the 3D reconstruction unit 217 in FIG. 10. As illustrated in FIG. 11, the 3D reconstruction unit 217 has a correction setting unit 251 and a reconstruction unit 252.

The correction setting unit 251 performs processing related to control of correction of 3D data. For example, the correction setting unit 251 acquires an occupancy map with N×N accuracy after decoding supplied from the OMap decoding unit 215. Furthermore, the correction setting unit 251 acquires correction information supplied from the auxiliary patch information decoding unit 212.

This correction information may include, for example, information indicating the set removal way of blank (correction type of blank). For example, this correction information may include information indicating an optimum pattern selected from candidates of "pattern of removal way of blank" prepared in advance.

Furthermore, this correction information may include, for example, information indicating a set correction amount of blank (e.g., removal amount or increase amount, or both).

The correction setting unit 251 sets how to perform correction on the basis of the information. The correction setting unit 251 generates control information in order to realize correction according to the setting, and supplies the control information to the reconstruction unit 252.

The reconstruction unit 252 performs processing related to reconstruction of 3D data. For example, the reconstruction unit 252 reconstructs 3D data on the basis of position information extracted from the geometry video frame supplied from the unpacking unit 216, or attribute information extracted from the color video frame supplied from the unpacking unit 216. Furthermore, the reconstruction unit 252 corrects the 3D data according to control of the correction setting unit 251 (according to control information supplied from the correction setting unit 251). The reconstruction unit 252 outputs the generated (corrected) 3D data to the outside of the decoding device 200.

<Flow of Decoding Processing>

Processing to be executed by such a decoding device 200 will be described. First, an example of the flow of decoding processing will be described with reference to the flowchart of FIG. 12.

When the decoding processing is started, the demultiplexer 211 of the decoding device 200 demultiplexes the bit stream in step S201.

In step S202, the auxiliary patch information decoding unit 212 decodes the coded data of the auxiliary patch information extracted from the bit stream by the process of step S201 and generates auxiliary patch information and correction information.

In step S203, the OMap decoding unit 215 decodes the coded data of the occupancy map extracted from the bit stream by the process of step S201.

In step S204, the video decoding unit 213 decodes the coded data of the geometry video frame extracted from the bit stream by the process of step S201 and generates a geometry video frame.

In step S205, the video decoding unit 214 decodes the coded data of the color video frame extracted from the bit stream by the process of step S201 and generates a color video frame.

In step S206, the unpacking unit 216 unpacks each of the geometry video frame and the color video frame on the basis of control information related to packing and the occupancy map.

In step S207, the 3D reconstruction unit 217 executes the 3D data reconstruction processing, and reconstructs 3D data such as a point club, for example, on the basis of the auxiliary patch information generated in step S202 and various information generated in steps S203 to S205. Furthermore, the 3D reconstruction unit 217 corrects the reconstructed 3D data on the basis of the correction information generated in step 3202. When the process of step S207 is completed, the decoding processing is completed.

<Flow of 3D Data Reconstruction Processing>

Figure 12:
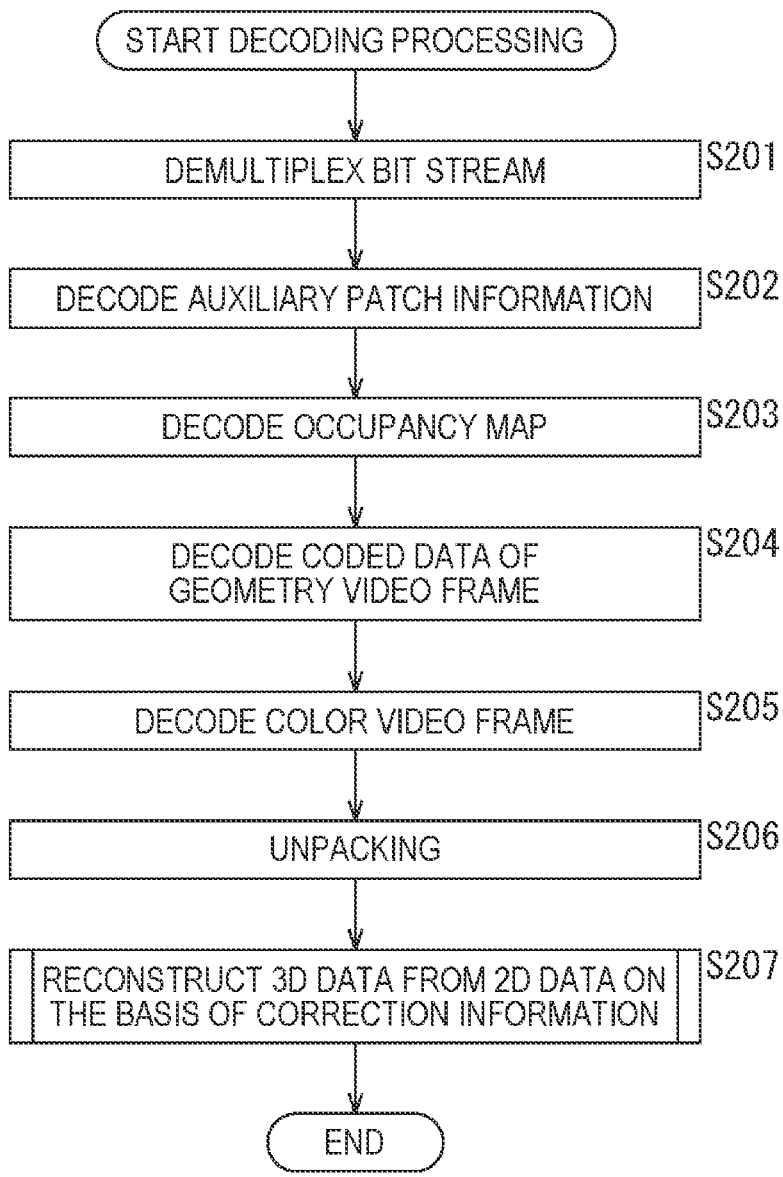
FIG. 12 is a flowchart for explaining an example of the flow of decoding processing.
Figure 13:
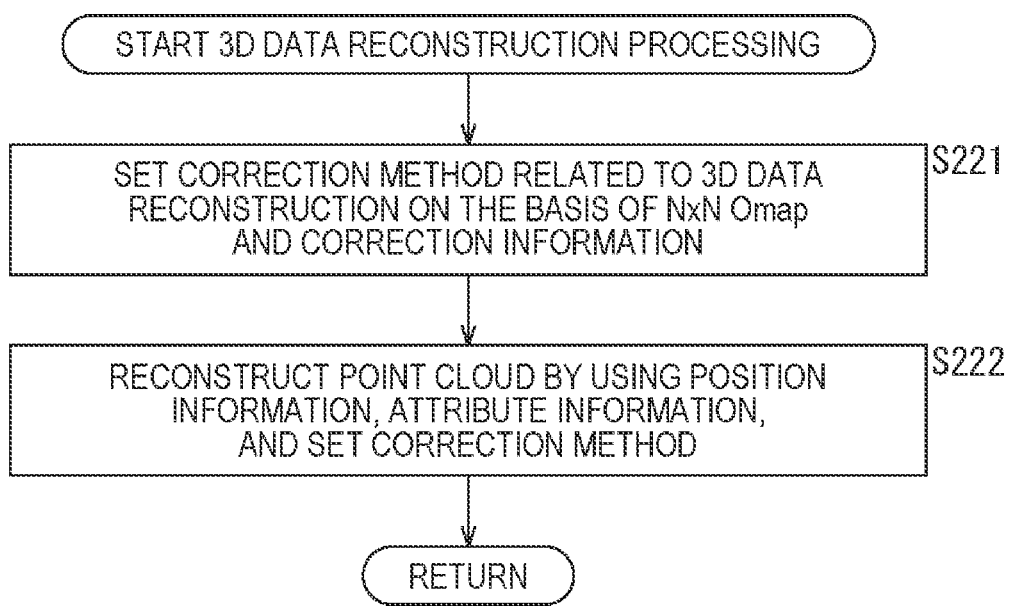
FIG. 13 is a flowchart for explaining an example of the flow of 3D data reconstruction processing.

Next, an example of the flow of 3D data reconstruction processing to be executed in step S207 of FIG. 12 will be described with reference to the flowchart of FIG. 13.

When the 3D data reconstruction processing is started, the correction setting unit 251 sets a correction method related to 3D data reconstruction in step S221 on the basis of the occupancy map with N×N accuracy after decoding and the correction information, and generates control information.

In step S222, the reconstruction unit 252 reconstructs 3D data such as a point cloud by using position information (geometry data), attribute information (picture data), and the correction method set in step S221. More specifically, the reconstruction unit 252 reconstructs 3D data on the basis of position information (geometry data), attribute information (picture data), auxiliary patch information, and the like.

Then, the reconstruction unit 252 corrects the reconstructed 3D data according to the control information supplied from the correction setting unit 251.

By executing each process as described above, the decoding device 200 can correct the 3D data on the basis of the correction information supplied from the coding side. Therefore, deterioration of 3D data can be suppressed, and lowering of the subjective image quality of the display image can be suppressed.

4. APPENDIX

<Control Information>

The control information related to the present technology described in each of the above embodiments may be transmitted from the coding side to the decoding side. For example, control information (e.g., enabled_flag) for controlling whether application of the above-described present technology is permitted (or prohibited) or not may be transmitted. Furthermore, for example, control information that specifies a range (e.g., an upper limit or a lower limit of a block size, or both, a slice, a picture, a sequence, a component, a view, a layer, etc.) for which application of the above-described present technology is permitted (or prohibited) may be transmitted.

<Computer>

The above-described series of processes can be executed by hardware or by software. In a case where a series of processes is executed by software, a program that constitutes the software is installed on a computer. Here, the computer includes a computer embedded in dedicated hardware, a general-purpose personal computer capable of executing various functions by installing various programs, for example, or the like.

FIG. 14 is a block diagram illustrating a configuration example of hardware of a computer that executes the above-described series of processes programmatically.

In a computer 900 illustrated in FIG. 14, a central processing unit (CPU) 901, a read only memory (ROM) 902, and a random access memory (RAM) 903 are connected with each other via a bus 904.

An input/output interface 910 is also connected with the bus 904. An input unit 911, an output unit 912, a storage unit 913, a communication unit 914, and a drive 915 are connected with the input/output interface 910.

The input unit 911 includes, for example, a keyboard, a mouse, a microphone, a touch panel, an input terminal, or the like. The output unit 912 includes, for example, a display, a speaker, an output terminal, or the like. The storage unit 913 includes, for example, a hard disk, a RAM disk, a non-volatile memory, or the like. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads a program stored in the storage unit 913 into the RAM 903 via the input/output interface 910 and the bus 904 and executes the program, for example, so as to perform the above-described series of processes. The RAM 903 also appropriately stores data or the like necessary for the CPU 901 to execute various processes.

The program to be executed by the computer can be recorded in and applied to the removable medium 921 as a package media or the like, for example. In that case, the program can be installed in the storage unit 913 via the input/output interface 910 by mounting the removable medium 921 in the drive 915.

Furthermore, the program can also be provided via a wired or wireless transmission medium such as a local area network, the Internet, or a digital satellite broadcast. In that case, the program can be received by the communication unit 914 and installed in the storage unit 913.

In addition, this program can also be pre-installed in the ROM 902 or the storage unit 913.

<Applicable Target of the Present Technology>

Although the above description has explained the case of applying the present technology to coding/decoding of point cloud data, the present technology is not limited to these examples and can be applied to coding/decoding of 3D data of any standard. That is, various processes such as coding/decoding methods, and specifications of various data such as 3D data or metadata are arbitrary, as long as there is no contradiction with the above-described present technology. Furthermore, some of the above-described processes or specifications may be omitted as long as there is no contradiction with the present technology.

Furthermore, although the above description has explained the coding device 100 and the decoding device 200 as application examples of the present technology, the present technology can be applied to any configuration.

For example, the present technology can be applied to various electronic apparatuses such as a transmitter or a receiver (e.g., television receiver or mobile phone) for satellite broadcasting, cable broadcasting such as cable TV, distribution on the Internet, distribution to terminals by cellular communication, and the like, or a device (e.g., hard disk recorder or camera) that records images on media such as an optical disk, a magnetic disk, and a flash memory, or reproduces images from these storage media.

Furthermore, for example, the present technology can be implemented as a configuration of a part of a device such as a processor (e.g., video processor) as a system large scale integration (LSI) or the like, a module (e.g., video module) that uses a plurality of processors or the like, a unit (e.g., video unit) that uses a plurality of modules or the like, or a set (e.g., video set) in which other functions are further added to a unit.

Furthermore, for example, the present technology can also be applied to a network system configured with a plurality of devices. For example, the present technology may be implemented as cloud computing that is shared and jointly processed by a plurality of devices via a network. For example, the present technology may be implemented in a cloud service that provides services related to images (moving images) to any terminals such as a computer, an audio visual (AV) apparatus, a portable information processing terminal, and an Internet of things (IoT) device.

In the present specification, note that a system means a set of a plurality of components (devices, modules (components), etc.), and whether all the components are placed in the same housing or not does not matter. Accordingly, a plurality of devices that are housed in separate housings and connected via a network, and one device in which a plurality of modules is housed in one housing are both systems.

<Fields and Applications to which the Present Technology can be Applied>

Systems, devices, processing units, and the like to which the present technology is applied can be used in any field such as transportation, medical care, crime prevention, agriculture, livestock industry, mining, beauty, factories, home appliances, weather, or nature monitoring, for example. Furthermore, the application thereof is also arbitrary.

<Others>

In this specification, note that a "flag" is information for identifying a plurality of states, and includes not only information used for identifying two states of true (1) or false (0), but also information capable of identifying three or more states. Accordingly, this "flag" can take, for example, two values of 1/0, or 3 or more values. In other words, the number of bits that configure this "flag" is arbitrary, and may be one bit or a plurality of bits. Furthermore, since the identification information (including the flag) is assumed to include not only the identification information included in the bit stream but also the difference information of the identification information with respect to a certain reference information included in the bit stream, the "flag" and the "identification information" in the present specification include not only the information but also the difference information with respect to the reference information.

Furthermore, various information (metadata, etc.) regarding coded data (bit stream) may be transmitted or recorded in any form as long as it is associated with the coded data. Here, the term "to associate" means, for example, to make the other data available (linkable) for processing one data. That is, data associated with each other may be combined as one data or may be individual data. For example, information associated with coded data (image) may be transmitted on a transmission path different from that of the coded data (image). Furthermore, for example, information associated with coded data (image) may be recorded on a recording medium (or another recording area of the same recording medium) different from the coded data (image). Note that this "associating" may be a part of the data, not the entire data. For example, an image and information corresponding to the image may be associated with each other in any unit such as a plurality of frames, one frame, or a part of a frame.

Note that terms such as "to synthesize", "to multiplex", "to add", "to integrate", "to put into", "to store", "to bring in", "to take in", and "to insert" in this specification mean to combine a plurality of objects into one, for example, to combine coded data and metadata into one data, and mean one method of "to associate" described above.

Furthermore, embodiments of the present technology are not limited to the above-described embodiments, and various modifications can be made without departing from the gist of the present technology.

For example, the configuration described as one device (or processing unit) may be divided to be configured as a plurality of devices (or processing units). On the contrary, the configurations described above as a plurality of devices (or processing units) may be combined to be configured as one device (or processing unit). Furthermore, of course, a configuration other than the above-described configurations may be added to the configuration of each device (or each processing unit). Moreover, a part of the configuration of one device (or processing unit) may be included in the configuration of another device (or another processing unit) as long as the configuration and operation as the entire system are substantially the same.

Furthermore, for example, the above-described program may be executed in any device. In that case, the device is only required to have necessary functions (functional blocks, etc.) so that necessary information can be obtained.

Furthermore, for example, each step of one flowchart may be executed by one device, or may be shared and executed by a plurality of devices. Moreover, in a case where one step includes a plurality of processes, the plurality of processes may be executed by one device, or shared and executed by a plurality of devices. In other words, a plurality of processes included in one step can be executed as processes of a plurality of steps. On the contrary, processes described as a plurality of steps also can be collectively executed as one step.

Furthermore, in a program to be executed by a computer, for example, processes of steps for describing a program may be executed in chronological order in the order described in the present specification, or may be executed in parallel, or individually at required timing such as when invocation is made. That is, processes of respective steps may be executed in an order different from the above-described order as long as there is no contradiction. Moreover, the processes of steps for describing this program may be executed in parallel with processes of another program, or may be executed in combination with processes of another program.

Furthermore, for example, a plurality of technologies related to the present technology can each be implemented independently and alone as long as there is no contradiction. Of course, any plurality of the present technologies can be carried out in combination. For example, a part or all of the present technology described in any of the embodiments may be implemented in combination with a part or all of the present technology described in another embodiment. Furthermore, it is also possible to carry out a part or all of any of the above-described present technology in combination with other technology that is not described above.

Note that the present technology can have the following configurations.

(1) An image processing device including:
  a correction information generation unit that generates correction information that is information regarding correction of 3D data representing a three-dimensional structure constructed using 2D data representing a two-dimensional image; and
  a correction information coding unit that codes the correction information generated by the correction information generation unit.

(2) The image processing device according to (1),
  in which the correction information generation unit generates the correction information on the basis of an occupancy map with 1×1 accuracy and an occupancy map with N×N accuracy.

(3) The image processing device according to (2),
  in which the correction information generation unit further generates the correction information on the basis of a remainder amount that is a set value of the size of blank that is a part of the 3D data enlarged by an occupancy map.

(4) The image processing device according to (1),
  in which the correction information includes information regarding correction of blank that is a part of the 3D data enlarged by an occupancy map.

(5) The image processing device according to (4),
  in which the information regarding correction of blank includes information indicating a removal way of the blank.

(6) The image processing device according to (5),
  in which the information regarding correction of blank includes information indicating a pattern of a removal way of the blank selected from candidates.

(7) The image processing device according to (4),
  in which the information regarding correction of blank includes information indicating a correction amount of the blank.

(8) The image processing device according to (7),
  in which the information indicating a correction amount of blank includes information indicating a removal amount of the blank.

(9) The image processing device according to (7),
  in which the information indicating a correction amount of blank includes information indicating an increase amount of the blank.

(10) An image processing method including:
  generating correction information that is information regarding correction of 3D data representing a three-dimensional structure constructed using 2D data representing a two-dimensional image; and
  coding the generated correction information.

(11) An image processing device including:
  a correction information decoding unit that decodes coded data of correction information that is information regarding correction of 3D data representing a three-dimensional structure constructed using 2D data representing a two-dimensional image; and
  a construction unit that constructs the 3D data by using the 2D data and the correction information generated by decoding coded data of the correction information by the correction information decoding unit.

(12) The image processing device according to (11),
  in which the correction information includes information regarding correction of blank that is a part of the 3D data enlarged by an occupancy map.

(13) The image processing device according to (12),
  in which the information regarding correction of blank includes information indicating a removal way of the blank.

(14) The image processing device according to (13),
  in which the information regarding correction of blank includes information indicating a pattern of a removal way of the blank selected from candidates.

(15) The image processing device according to (12),
  in which the information regarding correction of blank includes information indicating a correction amount of the blank.

(16) The image processing device according to (15),
  in which the information indicating a correction amount of blank includes information indicating a removal amount of the blank.

(17) The image processing device according to (15),
  in which the information indicating a correction amount of blank includes information indicating an increase amount of the blank.

(18) The image processing device according to (11), further including
  a video decoding unit that decodes coded data of the 2D data,
  in which the construction unit constructs the 3D data by using the 2D data decoded and generated by the video decoding unit, and the correction information generated by decoding the coded data by the correction information decoding unit.

(19) The image processing device according to (11), further including
  an OMap decoding unit that decodes coded data of an occupancy map,
  in which the construction unit corrects blank that is a part enlarged by an occupancy map decoded and generated by the OMap decoding unit during construction of the 3D data from the 2D data by using the correction information generated by decoding coded data of the correction information by the correction information decoding unit.

(20) An image processing method including:
  decoding coded data of correction information that is information regarding correction of 3D data representing a three-dimensional structure constructed using 2D data representing a two-dimensional image; and
  constructing the 3D data by using the 2D data and the correction information generated by decoding coded data of the correction information.

REFERENCE SIGNS LIST

100 Coding device
111 Patch decomposition unit
112 Packing unit
113 Auxiliary patch information compression unit
114 Video coding unit
115 Video coding unit
116 OMap coding unit
117 Multiplexer
118 Decoding unit
119 Correction information generation unit
151 Type setting unit
152 Removal amount setting unit
200 Decoding device
211 Demultiplexer
212 Auxiliary patch information decoding unit
213 Video decoding unit
214 Video decoding unit
215 OMap decoding unit
216 Unpacking unit
217 3D reconstruction unit
251 Correction setting unit
252 Reconstruction unit

The invention claimed is:

1. An image encoding device comprising:
  circuitry configured to:
    generate from 3D data, 2D data including a geometry video frame, a color video frame, and an occupancy map each corresponding to the 3D data, wherein
      the occupancy map includes a first patch and a second patch, and
      a border region of the first patch including a first blank part is overlapped with a border region of the second patch including a second blank part;
    generate filtering information indicating a removal way of at least one of the first blank part or the second blank part; and
    encode the 2D data and the filtering information.

2. The image processing encoding device according to claim 1,
  wherein the occupancy map includes a 1×1 occupancy map having 1×1 accuracy and an N×N occupancy map having N×N accuracy, and
  wherein the circuitry is further configured to generate the filtering information on a basis of the 1×1 occupancy map and the N×N accuracy map.

3. The image encoding device according to claim 1,
  wherein the circuitry is further configured to generate the filtering information on a basis of a size of the at least one of the first blank part or the second blank part.

4. The image encoding device according to claim 1,
  wherein the filtering information indicates an index of the removal way selected from candidates.

5. The image encoding device according to claim 1,
  wherein the filtering information indicates a removal amount of the at least one of the first blank part or the second blank part.

6. An image encoding method comprising:
  generating from 3D data, 2D data including a geometry video frame, a color video frame, and an occupancy map each corresponding to the 3D data, wherein
    the occupancy map includes a first patch and a second patch, and
    a border region of the first patch including a first blank part is overlapped with a border region of the second patch including a second blank part;
  generating filtering information indicating a removal way of at least one of the first blank part or the second blank part; and
  encoding the 2D data and the filtering information.

7. An image decoding device comprising:
  circuitry configured to:
    decode coded data to acquire 2D data including a geometry video frame, a color video frame, and an occupancy map, wherein the occupancy map includes a first patch and a second patch, and a border region of the first patch including a first blank part is overlapped with a border region of the second patch including a second blank part, and to acquire filtering information indicating a removal way of at least one of the first blank part or the second blank part;
    correct the occupancy map on a basis of the filtering information; and
    reconstruct 3D data on a basis of the geometry video frame, the color video frame and the corrected occupancy map.

8. The image processing device according to claim 7,
  wherein the filtering information indicates an index of the removal way selected from candidates.

9. The image processing device according to claim 7,
  wherein the filtering information indicates a removal amount of the at least one of the first blank part or the second blank part.

10. An image decoding method comprising:
  decoding coded data to acquire
    2D data including a geometry video frame, a color video frame, and an occupancy map, wherein the occupancy map includes a first patch and a second patch, and a border region of the first patch including a first blank part is overlapped with a border region of the second patch including a second blank part, and
    filtering information indicating a removal way of at least one of the first blank part or the second blank part;
  correcting the occupancy map on a basis of the filtering information; and
  reconstructing 3D data on a basis of the geometry video frame, the color video frame and the corrected occupancy map.

* * * * *